(12) United States Patent
Cheng et al.

(10) Patent No.: US 9,509,469 B2
(45) Date of Patent: Nov. 29, 2016

(54) DEVICE, NETWORK, AND METHOD FOR UTILIZING A DOWNLINK DISCOVERY REFERENCE SIGNAL

(71) Applicant: Futurewei Technologies, Inc., Plano, TX (US)

(72) Inventors: Qian Cheng, Aurora, IL (US); Jialing Liu, Palatine, IL (US); Weimin Xiao, Palatine, IL (US)

(73) Assignee: Futurewei Technologies, Inc., Plano, TX (US)

( * ) Notice: Subject to any disclaimer, the term of this patent is extended or adjusted under 35 U.S.C. 154(b) by 66 days.

(21) Appl. No.: 14/244,515

(22) Filed: Apr. 3, 2014

(65) Prior Publication Data

US 2014/0301301 A1    Oct. 9, 2014

Related U.S. Application Data

(60) Provisional application No. 61/808,536, filed on Apr. 4, 2013, provisional application No. 61/813,062, filed on Apr. 17, 2013.

(51) Int. Cl.
*H04L 5/00* (2006.01)
*H04W 36/00* (2009.01)
*H04L 5/14* (2006.01)

(52) U.S. Cl.
CPC .............. *H04L 5/0048* (2013.01); *H04L 5/00* (2013.01); *H04L 5/0073* (2013.01); *H04W 36/0072* (2013.01); *H04L 5/1469* (2013.01)

(58) Field of Classification Search
CPC . H04W 28/04; H04W 72/04; H04W 72/042; H04W 88/08; H04L 5/0007
USPC ........................................................ 370/329
See application file for complete search history.

(56) References Cited

U.S. PATENT DOCUMENTS

| 8,976,698 | B2* | 3/2015 | Chen | H04W 24/00 370/252 |
| 9,014,115 | B2* | 4/2015 | Gaur | H04J 11/0053 370/329 |
| 2010/0298001 | A1* | 11/2010 | Dimou | H04W 64/006 455/441 |
| 2010/0322179 | A1* | 12/2010 | Yu | H04L 5/0048 370/329 |

(Continued)

OTHER PUBLICATIONS

3GPP, 3rd Generation Partnership Project; Technical Specification Group Radio Access Network; Small cell enhancements for E-UTRA and E-UTRAN—Physical layer aspects (Release 12), 3GPP TR 36.872 V12.1.0, Dec. 2013, 100 pages.

(Continued)

*Primary Examiner* — Mohammad Anwar
*Assistant Examiner* — Sanjay K Dewan
(74) *Attorney, Agent, or Firm* — Slater Matsil, LLP

(57) ABSTRACT

User equipments can achieve quick channel synchronization when establishing a connection to base stations transitioning from a sleep mode to an active mode by using discovery resource signal (DRS) processing results and cell reference signal (CRS) processing results to establish channel synchronization with a CRS antenna port. More specifically, the user equipment may be notified that the CRS antenna port and DRS antenna port are quasi-co-located (QCL), and then use DRS processing results in conjunction with CRS processing results to obtain faster channel synchronization with a CRS antenna port. This may be particularly beneficial when the target BS is transitioned from a sleep mode to an active mode in order to accept a handover of the user equipment.

31 Claims, 15 Drawing Sheets

(56) References Cited

U.S. PATENT DOCUMENTS

| | | | |
|---|---|---|---|
| 2011/0141987 A1* | 6/2011 | Nam | H04L 1/0003 370/329 |
| 2011/0194536 A1* | 8/2011 | Kim | H04L 5/0023 370/335 |
| 2011/0235730 A1* | 9/2011 | Noh | H04B 7/0617 375/260 |
| 2012/0039302 A1* | 2/2012 | Chun | H04W 36/0027 370/331 |
| 2012/0163305 A1* | 6/2012 | Nimbalker | H04W 52/0206 370/329 |
| 2012/0201318 A1* | 8/2012 | Seo | H04L 27/2607 375/260 |
| 2012/0213109 A1* | 8/2012 | Xu | H04B 7/024 370/252 |
| 2013/0194931 A1* | 8/2013 | Lee | H04L 5/0053 370/241 |
| 2013/0322273 A1* | 12/2013 | Etemad | H04W 24/10 370/252 |
| 2014/0064247 A1* | 3/2014 | Teyeb | H04W 36/0083 370/331 |
| 2015/0092655 A1* | 4/2015 | Liao | H04J 11/005 370/312 |
| 2015/0092768 A1* | 4/2015 | Ng | H04W 48/16 370/350 |

OTHER PUBLICATIONS

3GPP, 3rd Generation Partnership Project; Technical Specification Group Radio Access Network; Evolved Universal Terrestrial Radio Access (E-UTRA); Physical channels and modulation (Release 12), 3GPP TS 36.211 V12.1.0, Mar. 2014, 120 pages.

Huawei, Hilsilicon, "Considerations on Frequency Offset Tests in Non-co-located Antenna Deployments," 3GPP TSG-RAN WG4, Meeting #66, St. Julian's Malta, Jan. 28-Feb. 1, 2013, 4 pages.

International Search Report from International Application No. PCT/CN2014/074816, Mailed Aug. 11, 2014, 11 pages.

* cited by examiner

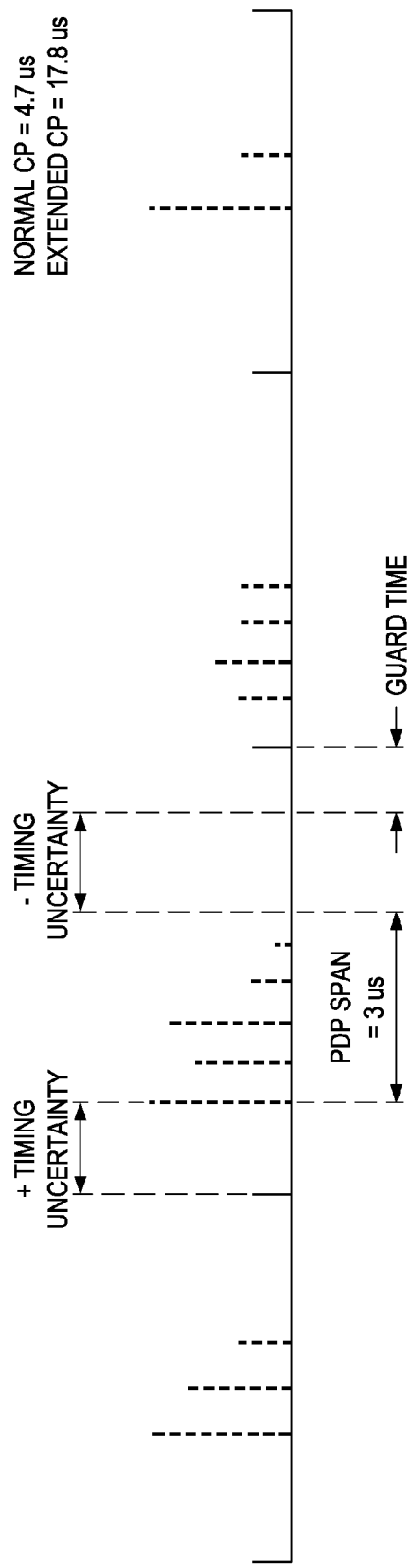

| SPECIAL DISCOVERY CONFIGURATION | NORMAL CYCLIC PREFIX IN SDS | | EXTENDEE CYCLIC PREFIX IN SDS | |
|---|---|---|---|---|
| | DwPTS (Ts) | DvPTS (Ts) | DwPTS (Ts) | DvPTS (Ts) |
| 0 | 19760 | 10960 | 20480 | 10240 |
| 1 | 21952 | 8768 | 23040 | 7680 |
| 2 | 24144 | 6576 | 25600 | 5120 |
| 3 | 26336 | 4384 | 28160 | 2560 |
| 4 | 28528 | 2192 | | |

DEVICE, NETWORK, AND METHOD FOR UTILIZING A DOWNLINK DISCOVERY REFERENCE SIGNAL

This patent application claims priority to U.S. Provisional Application No. 61/808,536, filed on Apr. 4, 2013 and entitled "Device, Network, and Method Utilizing a Downlink Discovery Reference Signal" and U.S. Provisional Application No. 61/813,062, filed on Apr. 17, 2013 entitled "Systems and Methods for Adaptive Transmissions in Wireless Network," both of which are hereby incorporated by reference herein as if reproduced in its entireties.

TECHNICAL FIELD

The present description relates to wireless telecommunications, and, in particular embodiments, to a device, network, and method for utilizing a downlink discovery reference signal.

BACKGROUND

In modern wireless communications systems, a plurality of cells or base stations may be arranged into a cluster, with each cell having multiple transmit antennas and serving a number of users. In Orthogonal frequency-division multiplexing (OFDM) systems, the spectrum is divided into subcarriers in frequency domain and OFDM symbols in the time domain. One resource element is typically defined by the time-frequency resource within one subcarrier and one OFDM symbol. Wireless networks generally have a finite number of resource elements over which to communicate data, with the network's throughput capacity generally corresponding to the collective carrying capacity of the network's resource elements.

The increasing demand for wireless bandwidth is expected to push the limits of macro-cell deployment in next-generation networks. As such, next-generation networks may be configured to support small-cell deployment to increase data capacity, while still meeting customer's quality of service expectations and operators' requirements for cost-effective service delivery. Small-cells generally are low-power wireless access points that operate in a licensed spectrum. Small-cells provide improved cellular coverage, capacity and applications for homes and businesses, as well as metropolitan and rural public spaces. Different types of small-cells include, generally from smallest size to largest size, femtocells, pico-cells, metro-cells and micro-cells.

SUMMARY OF THE INVENTION

Technical advantages are generally achieved, by embodiments of this Application which describe a device, network, and method for utilizing a downlink discovery reference signal.

In accordance with an embodiment, a method for discovery reference signaling is provided. In this example, the method comprises receiving, by a user equipment (UE), a discovery reference signal (DRS) transmission over a first antenna port and a cell-specific reference signal (CRS) transmission over a second antenna port. The first antenna port is different from the second antenna port. The method further includes processing the DRS transmission to obtain a DRS processing result, processing the CRS transmission to obtain a CRS processing result, and using the DRS processing result in conjunction with the CRS processing result to establish channel synchronization with the second antenna port when the first antenna port and the second antenna port are quasi-co-located (QCL). An apparatus for performing this method is also provided.

In accordance with another embodiment, another method for discovery reference signaling is provided. In this example, the method comprises sending a first message to a user equipment indicating that a discovery resource signal (DRS) transmission is being communicated over a first antenna port. The DRS transmission is communicated by a target cell. The method further includes sending a second message to the user equipment indicating that a cell-specific reference signal (CRS) transmission is being communicated over a second antenna port. The second antenna port being different than the first antenna port, and the second antenna port and the first antenna port are quasi-co-located (QCL). The CRS transmission is communicated by the target cell. An apparatus for performing this method is also provided.

BRIEF DESCRIPTION OF THE DRAWINGS

For a more complete understanding of the present Application, and the advantages thereof, reference is now made to the following descriptions taken in conjunction with the accompanying drawing, in which:

FIG. 15 illustrates a graph of an embodiment cyclic shift range configuration;

FIG. 16 illustrates a table of embodiment cyclic shift configurations for small cell clusters.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
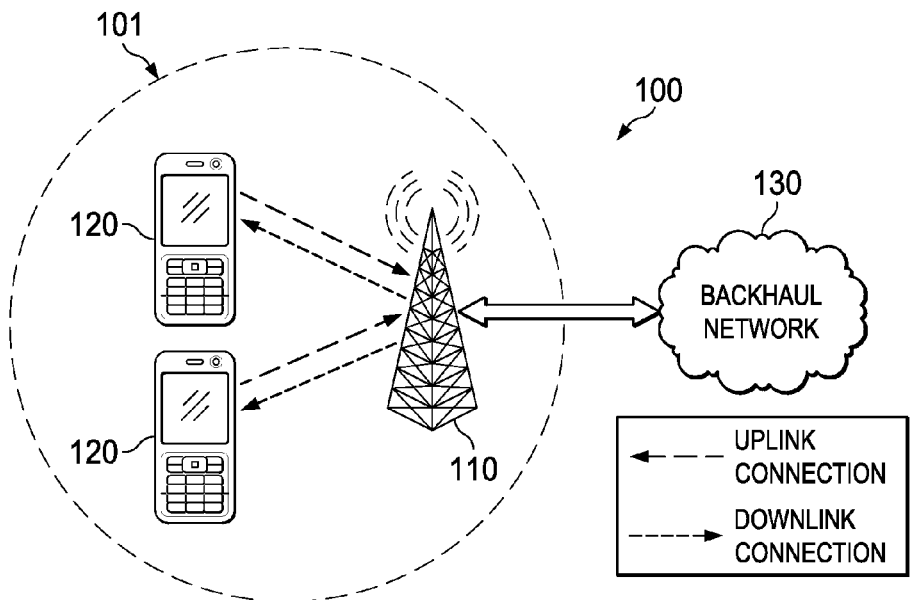
FIG. 1 illustrates a diagram of an embodiment wireless communications network.

The making and using of embodiments of this Application are discussed in detail below. It should be appreciated, however, that the present Application provides many concepts that can be embodied in a wide variety of specific contexts. The specific embodiments discussed are merely illustrative of specific ways to make and use the claimed invention, and do not limit the scope of the claimed invention.

In next generation wireless networks, small-cells may operate in a sleep mode during periods in which no user equipments are being served, and may transition from the sleep mode to an active mode when a user equipment attempts to access the small-cell, e.g., pursuant to a handover, etc. There are a few reasons for doing so, for example, to reduce interference caused by an active small cell (an active small cell, even though serving no UEs, needs to transmit common channels/signals such as CRS), to adapt to traffic load arrival, to conserve energy, and so on. Moreover, small-cells may communicate different discovery information depending on whether they are operating in a sleep or active mode. For example, small-cells operating in the active mode may typically communicate both discovery reference signal (DRS) transmissions and cell-specific reference signal (CRS) transmissions, while small-cells operating in the sleep mode may only communicate DRS transmissions. In this Application, DRS transmissions and CRS transmissions refer to corresponding discovery signals being communicated by a base station over the radio access network. Notably, DRS transmissions are typically communicated less frequently than CRS transmissions, thereby allowing small-cells operating in the sleep mode to conserve energy as well as generate less interference in the broadcast spectrum. CRS transmissions and DRS transmissions are typically communicated over different antenna ports, and are therefore associated with different channels by the user equipments. In this Application, the term "antenna port" may refer to a virtual or logical antenna port that is associated with signal transmissions performed under similar (or identical) channel conditions. Different antenna ports may be mapped to different resource elements within a downlink subframe, and/or to different physical antennas (or different combinations of physical antennas) in multi-antenna transmission modes. Symbols transmitted over a common antenna port are generally processed in accordance with the same channel characteristics, e.g., the receiver processes the signals using the channel information (e.g. fading, pathloss, etc.). To obtain characteristic channels for the antenna ports, a UE must traditionally carry out a separate channel estimation for each antenna port based on reference signals (e.g., pilot signals) communicated over that port. Accordingly, in conventional networks, user equipments may primarily (or exclusively) use CRS measurements to achieve channel synchronization with the CRS antenna port, which may delay channel synchronization when the user equipment is handed over to a small-cell that recently transitioned from sleep mode to active mode. Accordingly, techniques for achieving quick channel synchronization with small cells transitioning from the sleep mode to the active mode are desired.

Aspects of this Application allow user equipments to achieve quick channel synchronization when establishing a connection to base stations transitioning from a sleep mode to an active mode. More specifically, discovery resource signal (DRS) transmission and cell reference signal (CRS) transmission of a base station may be communicated over antenna ports that are quasi-co-located (QCL) with one another. Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, and average delay. A UE shall not assume that two antenna ports are quasi co-located unless specified otherwise. This QCL relationship may be signaled to user equipments such that DRS processing results can be used, in conjunction with CRS processing results (e.g., timing/frequency synchronization results, channel measurement results, and other results derived from CRS transmissions), to obtain faster channel synchronization with a CRS antenna port. In this Application, the term "DRS processing result" refers to any information derived from DRS transmission(s) that may be used for obtaining course and/or fine channel synchronization, e.g., timing/frequency synchronization results, channel measurement results, and other results derived from DRS transmission. The term "CRS processing result" refers to any information derived from CRS transmission(s) that may be used for obtaining course and/or fine channel synchronization, e.g., timing/frequency synchronization results, channel measurement results, and other results derived from CRS transmission. This may be particularly beneficial when the BS is transitioned from a sleep mode to an active mode in order to accept a handover of the user equipment. While much of this Application discusses techniques for achieving fast channel synchronization during handovers, those techniques are applicable to any link-setup situation. For example, the techniques for achieving fast channel synchronization may be used when a user equipment is establishing a link/connection with a secondary base station. While many aspects of this Application are described in the context of a handover between two base stations, those aspects are equally applicable to a handover between two cells associated with a common base station that is configured for carrier aggregation.

Another potential issue in next generation wireless networks is interference amongst DRS transmissions from neighboring small-cells. More specifically, small-cells may be positioned in dense clusters to achieve high throughput, and small-cells in the same cluster may generally communicate their DRS transmissions over the same resources. Accordingly, DRS transmissions of neighboring small-cells may experience significant interference. Aspects of this Application apply different cyclic shifts to DRS transmission of neighboring base stations (BSs), e.g., small-cells, etc., to mitigate interference amongst the DRS transmission of those BSs. These and other aspects are described in greater detail below.

Embodiment configurations may use aspects of this description in conjunction with aspects described in U.S.

Non-Provisional Patent Application 14/254,691 (hereinafter "the '691 Application"). As an example, a UE may receive a DRS transmission from a small cell operating in a sleep mode. If DRS processing results obtained from that DRS transmission satisfy a criteria (e.g., pathloss, etc.), the UE may transmit a transition request signal (TRS) in accordance with an embodiment transmission configuration (e.g., as Described by the ['231] application) to prompt the small cell to transition into an active mode. Upon transitioning into the active mode, the small cell may begin performing CRS transmissions. The UE may then determine that the DRS antenna port and the CRS antenna port have a QCL relationship (e.g., through in-band network signaling or otherwise), and may use the DRS processing results in conjunction with CRS processing results to achieve channel synchronization with the CRS antenna port. Other configurations are also possible.

FIG. 1 illustrates a network 100 for communicating data. The network 100 comprises an base station (BS) 110 having a coverage area 101, a plurality of user equipments (UEs) 120, and a backhaul network 130. The BS 110 may comprise any component capable of providing wireless access by, inter alia, establishing uplink (dashed line) and/or downlink (dotted line) connections with the user equipments 120, such as an enhanced base station (eNB), a low power node (e.g., femtocell, etc.), an access point (AP), and other wirelessly enabled devices. The user equipments 120 may comprise any component capable of establishing a wireless connection with the BS 110, such as a mobile station (STA), or other wirelessly enabled devices. The backhaul network 130 may be any component or collection of components that allow data to be exchanged between the BS 110 and a remote end (not shown). In some embodiments, the network 100 may comprise various other wireless devices, such as relays, low power nodes, etc.

Figure 2:
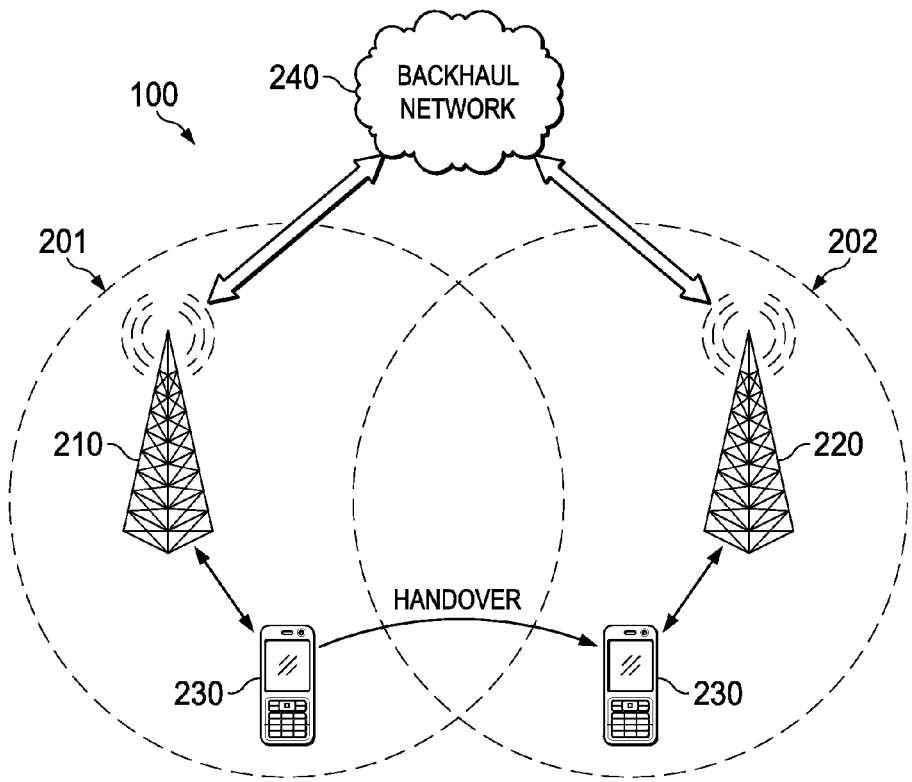
FIG. 2 illustrates a diagram of another embodiment wireless communications network.

In some situations, a user equipment will be handed over from one BS to another. FIG. 2 illustrates a network 200 for supporting a handover of a user equipment 230 from a source BS 210 to a target BS 220. As shown, the source BS 210 provides wireless access in a coverage area 201, while the target BS 220 provides wireless access in a coverage area 202. In some embodiments, the source BS 210 is a macro-cell and the target BS 220 is a small-cell. In other networks, the source BS 210 and the target BS 220 are both small-cells. In an embodiment, the target BS 220 is in a sleep mode prior to the handover, and consequently performs DRS transmissions without performing CRS transmissions. The user equipment 230 takes a measurement of the DRS transmissions performed by the target BS 220, and reports the DRS measurement to the source BS 210. The source BS 210, or some control agent (central, distributed, or otherwise), determines that the DRS measurement satisfies a criteria (e.g., exceeds a signal strength threshold, etc.), and initiates a handover of the user equipment 230 from the source BS 210 to the target BS 220. In an embodiment, this may entail prompting the target BS 220 to transition from the sleep mode to an active mode via signaling over the backhaul network 240. The target BS 220 may begin performing CRS transmissions upon transitioning to the active mode, and the user equipment 230 may begin measuring those CRS transmission. The DRS transmissions and CRS transmissions are communicated over different antenna ports, which are hereinafter referred to as the DRS antenna port and the CRS antenna port (respectively). The user equipment 230 will generally establish synchronization with a channel communicated over the CRS antenna port. Since different antenna ports are associated with different channels, the user equipment 230 would traditionally rely exclusively on the CRS measurements to achieve channel synchronization with the CRS antenna port. However, embodiments of this Application notify the user equipment 230 that the DRS antenna port is quasi-co-located with the CRS antenna port, thereby allowing the user equipment to use the DRS processing results (e.g., measurements, etc.) in conjunction with the CRS processing results to achieve synchronization with the channel communicated over the CRS antenna port. This may allow for quicker synchronization, as the DRS processing results may be available earlier than the CRS processing results, thereby providing the user equipment 230 with a head start on channel synchronization.

Figure 3:
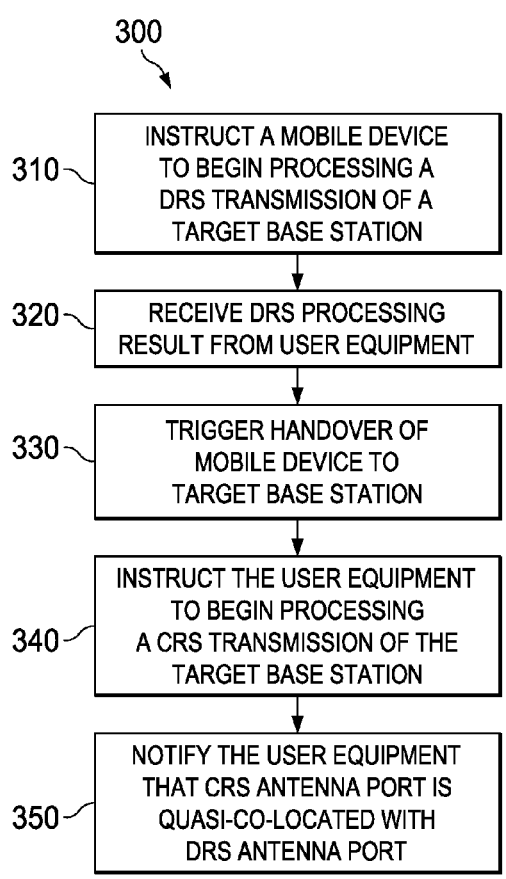
FIG. 3 illustrates a flowchart of an embodiment handover method.

Aspects of this Application provide methods for achieving fast channel synchronization via quasi-co-located DRS and CRS antenna ports. FIG. 3 illustrates an embodiment method 300 for achieving fast handovers, as might be performed by a network controller (e.g., a source base station, scheduler, etc.). As shown, the method 300 begins with step 310, where the controller instructs a user equipment to begin measuring a DRS transmission communicated over a DRS antenna port by a target base station. Thereafter, the method 300 proceeds to step 320, where the controller receives a DRS processing result (or control signaling pertaining thereto) from the mobile station. In some embodiments, the controller is a source base station that receives the DRS processing result directly from the user equipment. In other embodiments, the controller is a central or distributed controller (e.g., scheduler, macro-cell, etc.) that receives the DRS processing result indirectly from a source base station (e.g., a BS that reports to the scheduler, a small-cell that reports to the macrocell, etc.). In yet other embodiments, the controller simply receives an indication that the DRS processing result satisfies a criteria for handover without ever receiving the actual DRS processing result. Thereafter, the method 300 proceeds to step 340, where the controller triggers a handover of the user equipment to the target base station. In one embodiment, this entails prompting the target base station to transition from a sleep mode to an active mode. In such embodiments, the active base station may communicate both DRS transmissions and CRS transmission when operating in the active mode, while only communicating DRS transmission when operating in the sleep mode. Thereafter, the method 300 proceeds to step 340, where the controller instructs the user equipment to begin measuring a CRS transmission of the base station. Subsequently, the method 300 proceeds to step 350, where the controller notifies the user equipment that the CRS antenna port is quasi-co-located with the DRS antenna port, which may prompt the user equipment to utilize the DRS processing result in conjunction with the CRS processing result to achieve channel synchronization with the CRS antenna port. In some embodiments, the controller may notify the UE that the CRS antenna port is quasi-co-located with the DRS antenna port before the handover is triggered. Using the DRS processing results in conjunction with the CRS processing results may allow the user equipment to achieve faster channel synchronization with the CRS antenna port than would have otherwise been possible using only the CRS processing results.

Figure 4:
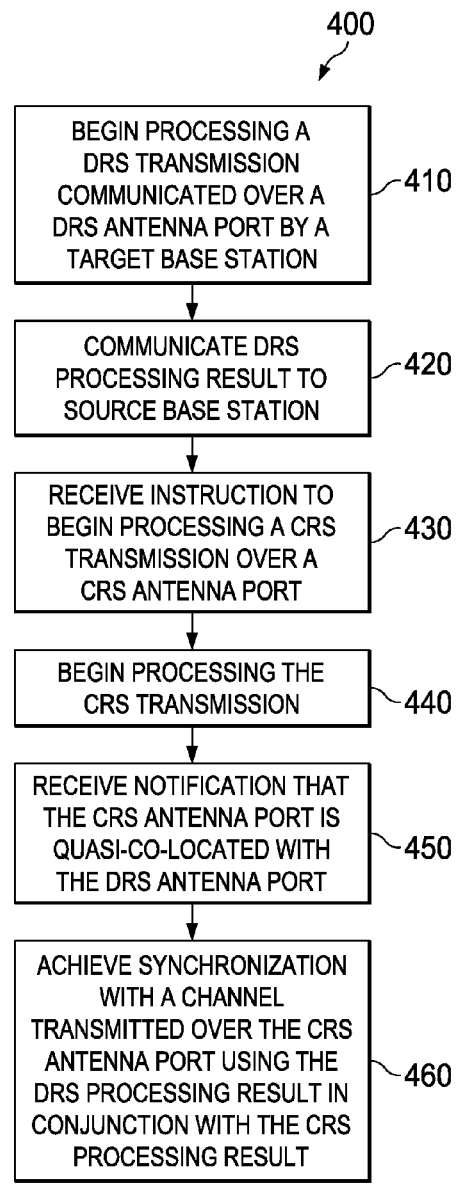
FIG. 4 illustrates a flowchart of another embodiment handover method.

FIG. 4 illustrates an embodiment method 400 for achieving fast handovers, as might be performed by user equipment. As shown the method 400 begins with step 410, where the user equipment begins measuring a DRS transmission communicated over a DRS antenna port by a target base station. Thereafter, the method proceeds to step 420, where the user equipment communicates the DRS processing result to a source base station. Next, the method proceeds to step 430, where the user equipment receives an instruction to begin measuring a CRS transmission over the CRS antenna port. Subsequently, the method proceeds to step 440, where the user equipment begins measuring the CRS transmission communicated over the CRS antenna port by the target base station. Thereafter, the method proceeds to step 450, where the user equipment receives a notification that CRS antenna port is quasi-co-located with DRS antenna port. Next, the method proceeds to step 460, where the user equipment Subsequently, the method proceeds to step 470, where the user equipment achieves synchronization with a channel transmitted over CRS antenna port using DRS processing results in conjunction with CRS processing results.

Figure 5:
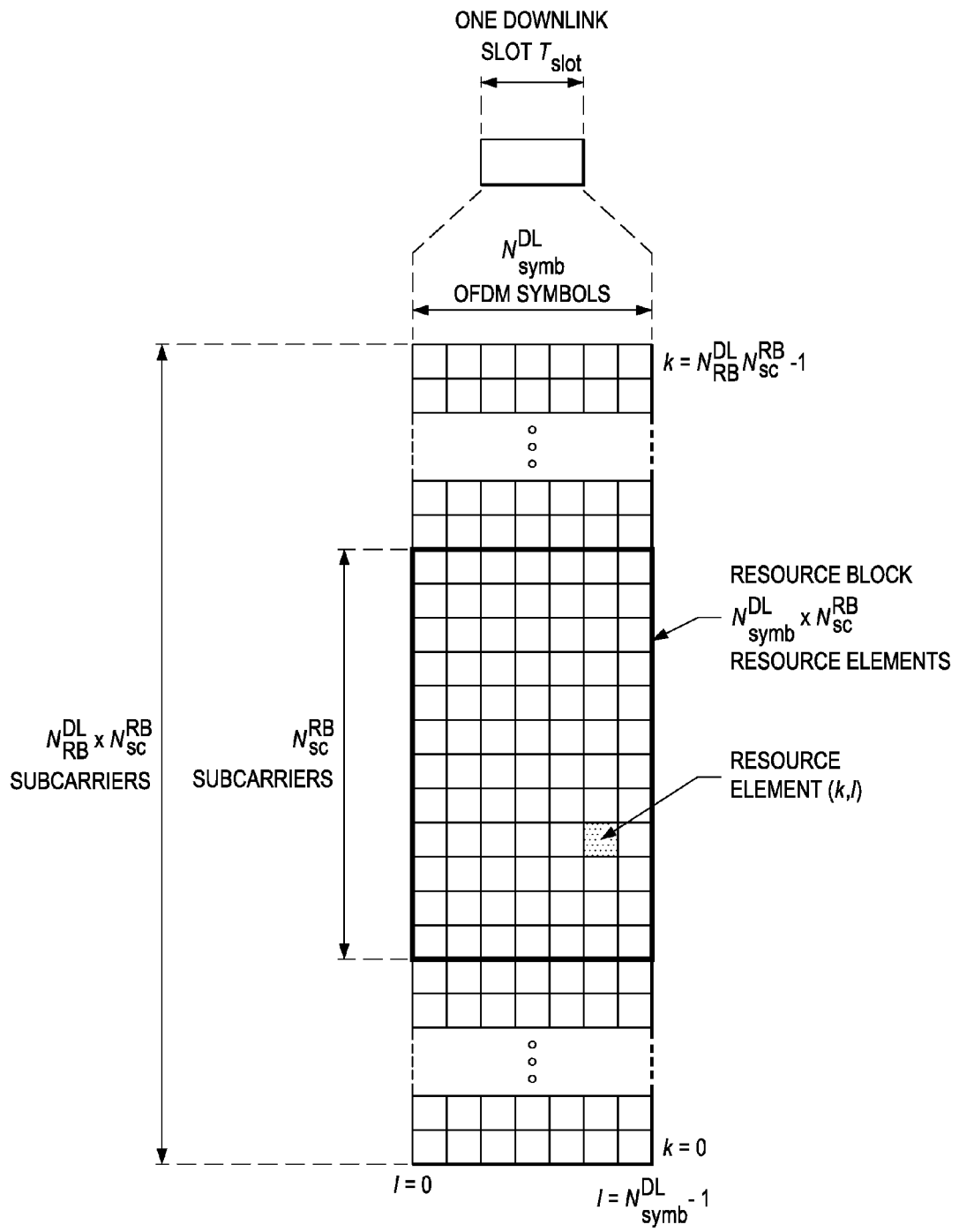
FIG. 5 illustrates a diagram of an embodiment configuration of OFDM symbols.

In Third Generation Partnership Project (3GPP) Long Term Evolution (LTE) compliant communications systems, reference signals and other signals, such as data channel, e.g., physical downlink shared channel (PDSCH), and control channel, e.g., physical downlink control channel (PDCCH), are orthogonal and multiplexed in different resource elements in time-frequency domain. Further, the signals are modulated and mapped into resource elements. Using inverse Fourier transform per each OFDM symbol, the signals in frequency domain are transformed into the signals in time domain, and are transmitted with added cyclic prefix to avoid the inter-symbol interference. Each resource block (RB) contains a number of REs. FIG. 5 illustrates an embodiment configuration of OFDM symbols. In some embodiments, the depicted OFDM symbols include a normal cyclic prefix (CP). As shown, there are fourteen OFDM symbols labeled from zero to thirteen in each subframe. The symbols zero through six in each subframe correspond to even slots, and the symbols seven through twelve in each subframe correspond to odd slots. For purposes of brevity and concision, only one time slot of a subframe is depicted. As shown, there are twelve subcarriers labeled from zero to eleven in each RB. In this example, there are 132 REs in an RB. The number of RBs in each subframe may depend on the bandwidth (BW) configuration of the subframe.

Figure 6:
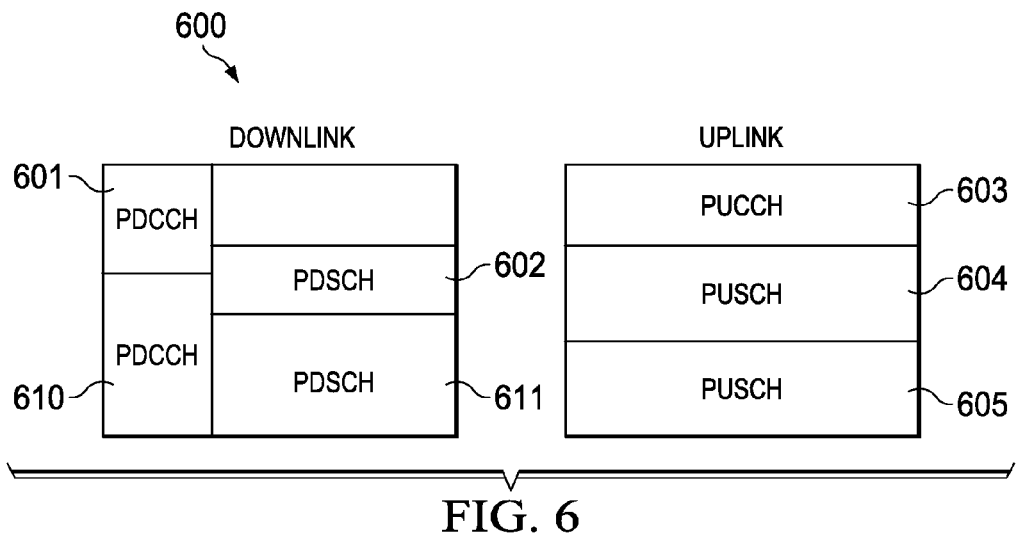
FIG. 6 illustrates a diagram of downlink channels.

FIG. 6 illustrates a channel configuration 600 for communicating information over a physical layer of the radio access network. As shown, the channel configuration 600 includes physical downlink shared channels (PDSCH) 602, 611, physical uplink shared channels (PUSCH) 603, 604, 605, and physical downlink control channels (PDCCH) 601, 610. The PDCCH 601 may indicate the signaling for PDSCH 602 or PUSCH 604. In Release 11, the enhanced PDCCH (EPDCCH) is a downlink control channel to have a similar functionality as PDCCH, but the transmission of EPDCCH may be in the data region of an LTE Rel-8 system, and EPDCCH demodulation is based on the DMRS as opposed to CRS-based demodulation for PDCCH.

Figure 7:
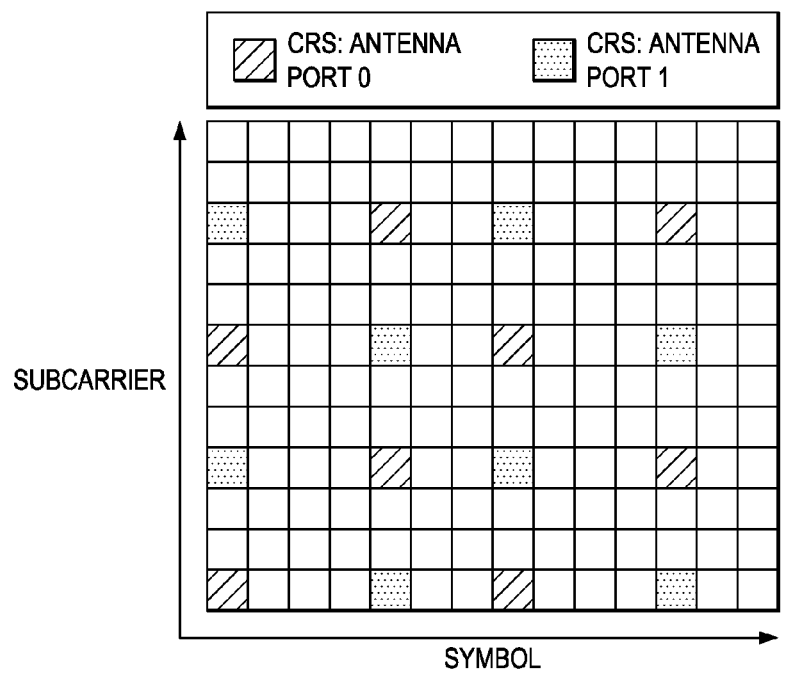
FIG. 7 illustrates a diagram of a resource block pair carrying cell-specific reference signals (CRS)

In downlink transmission of LTE-A systems, there is reference signal for a user equipment to perform channel estimation for demodulation of physical downlink control channel (PDCCH) and other common channels as well as for measurement and some feedbacks, which is common/cell-specific reference signal (CRS) inherited from the Rel-8/9 specification of E-UTRA. FIG. 7 illustrates a diagram of a resource block (RB) pair carrying cell-specific reference signals (CRS) configurations for antenna ports. Dedicated/de-modulation reference signal (DMRS) can be transmitted together with the physical downlink shared channel (PDSCH) channel in Rel-10 of E-UTRA. DMRS is used for channel estimation during PDSCH demodulation. DMRS can also be transmitted together with EPDCCH for the channel estimation of EPDCCH by the user equipment.

Figure 8:
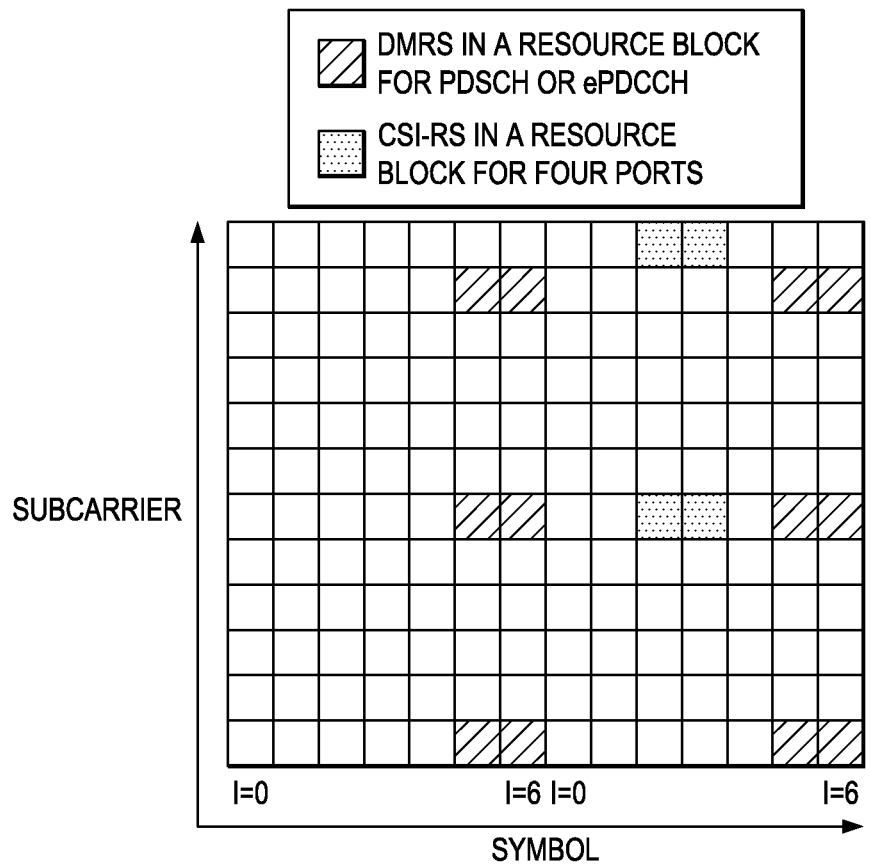
FIG. 8 illustrates a diagram of a resource block pair carrying channel state information reference signals (CSI-RSs) and demodulation reference signals (DMRSs)

In Rel-10, channel status indicator reference signal (CSI-RS) is introduced in addition to CRS (common reference signal) and DMRS (dedicated demodulation reference signal). FIG. 8 illustrates a diagram of a resource block pair carrying channel state information reference signals (CSI-RSs) and demodulation reference signals (DMRSs). CSI-RS is used for Rel-10 user equipments to measure the channel status, especially for multiple antennas cases. PMI/CQI/RI and other feedbacks may be based on the measurement of CSI-RS for Rel-10 and beyond user equipment. PMI is the precoding matrix indicator, and CQI is the channel quality indicator, and RI is the rank indicator of the precoding matrix. There may be multiple CSI-RS resources configured for a user equipment. There is specific time-frequency resource and scrambling code assigned by the eNB for each CSI-RS resource.

Figure 9:
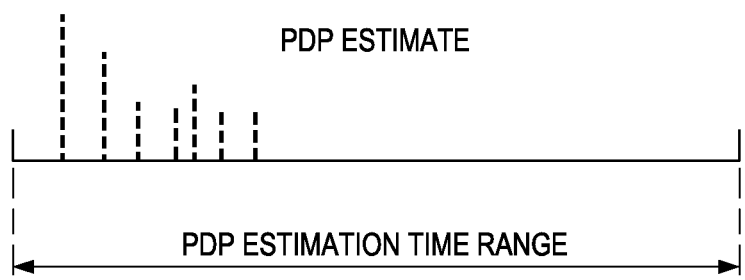
FIG. 9 illustrates a graph of an embodiment channel power delay profile (PDP) estimation.

Reference signals (e.g., CRS, CSI-RS, DMRS, etc.) may allow a receiver to estimate the channel impulse response and/or channel power delay profile (PDP). A reference signal (RS) may be a pseudorandom sequence that is Quadrature Phase Shift Key (QPSK) modulated on subcarriers assigned for the RS transmission. Upon receiving a RS, the receiver performs demodulation and descrambling using the conjugate of the pseudorandom sequence. The resulting signal is then transformed into time domain using an inverse fast Fourier transform (IFFT) operation to obtain the channel PDP estimation. Further measurements may be performed based on the obtained PDP estimates. FIG. 9 illustrates a graph of an embodiment channel power delay profile (PDP) estimation. For different tone spacings (e.g., subcarrier spacings), the illustrated PDP estimation time range may take different values. For example, when the RS occupies contiguous tones in an OFDM symbol, the time range is equal to the symbol duration. When the RS uniformly occupies one tone out of every 6 tones in an OFDM symbol, the time range is equal to one sixth of the symbol duration. Reference signals from different transmitters may be assigned to different sets of subcarriers, and can therefore be separated in the frequency domain. Reference signals from different transmitters may also be assigned to different pseudorandom sequences, and can therefore be separated via low correlation between the pseudorandom sequences. However, reference signals communicated over the same subcarriers using the same pseudorandom sequence may strongly interfere with each other.

Heterogeneous networks (Het-Nets) typically include a macro-cell and a small-cell, which may generally correspond to a higher power node having a relatively large coverage and a lower power node having a relatively small coverage area. Lower power nodes are typically low-power wireless base stations that operate in a licensed spectrum, such as pico-cells, micro-cells, relay-nodes, remote radio heads, remote radio units, distributed antennas, etc. Lower power nodes provide improved cellular coverage, capacity and applications for homes and businesses, as well as metropolitan and rural public spaces.

In the 3GPP Rel-10 specification, a component carrier is called a cell. When multiple cells are controlled by a same eNodeB, cross scheduling of multiple cells can be implemented because there may be a single scheduler in the same eNodeB to schedule the multiple cells. With carrier aggregation (CA), one eNB may operate and control several component carriers forming Pcell and Scell. In Rel-11 design, an eNodeB may control both a macro-cell and a pico-cell. In this case, the backhaul between the macro-cell and the pico-cell can be a fast network connection. The eNodeB may control the transmissions/receptions of both the macro-cell and the pico-cell dynamically. The PDCCH or EPDCCH transmitted from the macro-cells (or points) can be used to indicate the PDSCH or PUSCH transmitted from the pico-cell (or points).

The eNBs may be arranged close to each other so that a decision made by a first eNB may have an impact on a second eNB. For example, the eNBs may use their transmit antenna arrays to achieve beamforming. For instance, if a first eNB decides to serve a first user equipment in a particular time-frequency resource, it may form a beam pointing to that user equipment. However, the pointed beam may extend into a coverage area of the second eNB and cause interference to user equipments served by the second eNB. The inter-cell interference (ICI) for small-cell wireless communications systems is commonly referred to as an interference limited cell scenario, which may be different from a noise limited cell scenario seen in large cell wireless communications systems.

In Rel-12, the backhaul between the macro-cell and the pico-cell may be a slower connection than the fast backhaul discussed above. In a slow backhaul scenario, the PDCCH or EPDCCH transmitted from the macro-cells (or points) may not indicate the PDSCH or PUSCH transmitted from the pico-cell (or points). In an embodiment network, there may be multiple macro-cells and multiple pico-cells operating in multiple component carriers, and the backhaul between any two points can be fast backhaul or slow backhaul depending on the deployment. When two points have fast backhaul, the fast backhaul may be fully utilized, e.g., to simplify control signaling and/or improve coordination. In a network, the points configured for a user equipment for transmission or reception may include multiple points, some pairs of points may have fast backhaul, but some other pairs of points may have slow backhaul or any backhaul.

In an embodiment, an eNodeB may control one or more cells. Multiple remote radio units may be connected to the same baseband unit of the eNodeB by fiber cable, and the latency between baseband unit and remote radio unit may be relatively small. Therefore the same baseband unit can process the coordinated transmission/reception of multiple cells. For example, the eNodeB may coordinate the transmissions of multiple cells to a user equipment, which is called coordinated multiple point (CoMP) transmission. The eNodeB may also coordinate the reception of multiple cells from a user equipment, which is called CoMP reception. In this case, the backhaul link between these cells with the same eNodeB is fast backhaul and the scheduling of PDSCH transmitted in different cells for the user equipment can be easily coordinated in the same eNodeB.

As an extension of the Het-Net deployment, small-cells may be densely deployed to provide better performance in high traffic areas, such as (for example) hotspot deployments in indoor and outdoor scenarios. Low-power nodes are generally nodes having a transmission power that is lower than that of a macro-node. Low power nodes may include pico-base-stations and femto-base-stations. Small-cell enhancements for E-UTRA and E-UTRAN may include additional functionalities for enhanced performance in indoor and outdoor hotspots using densely deployed low power nodes.

Figure 10:
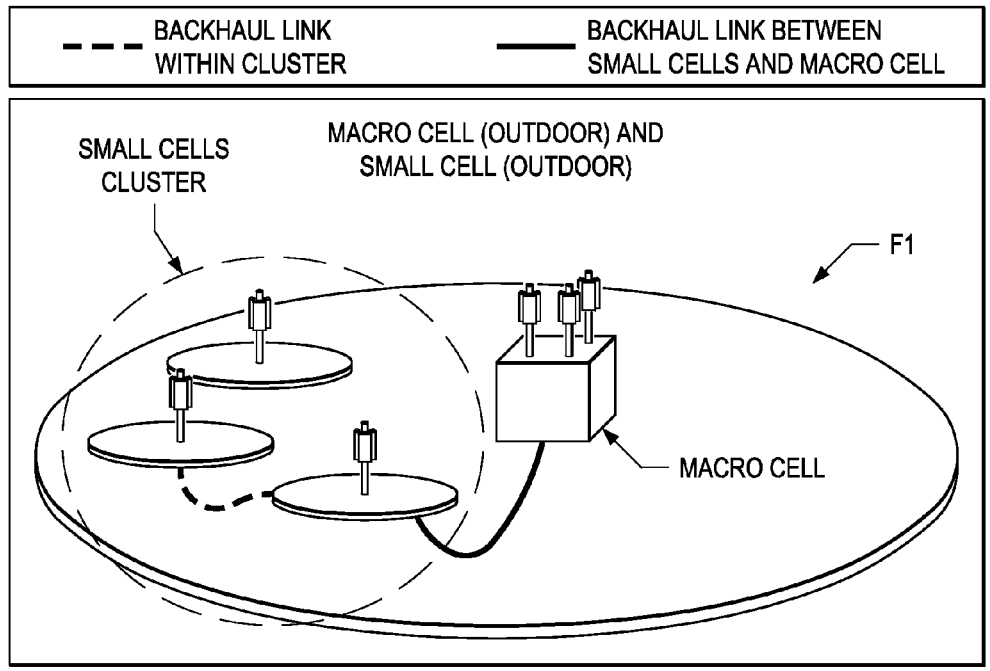
FIG. 10 illustrates a diagram of yet another embodiment wireless communications network.
Figure 11A:
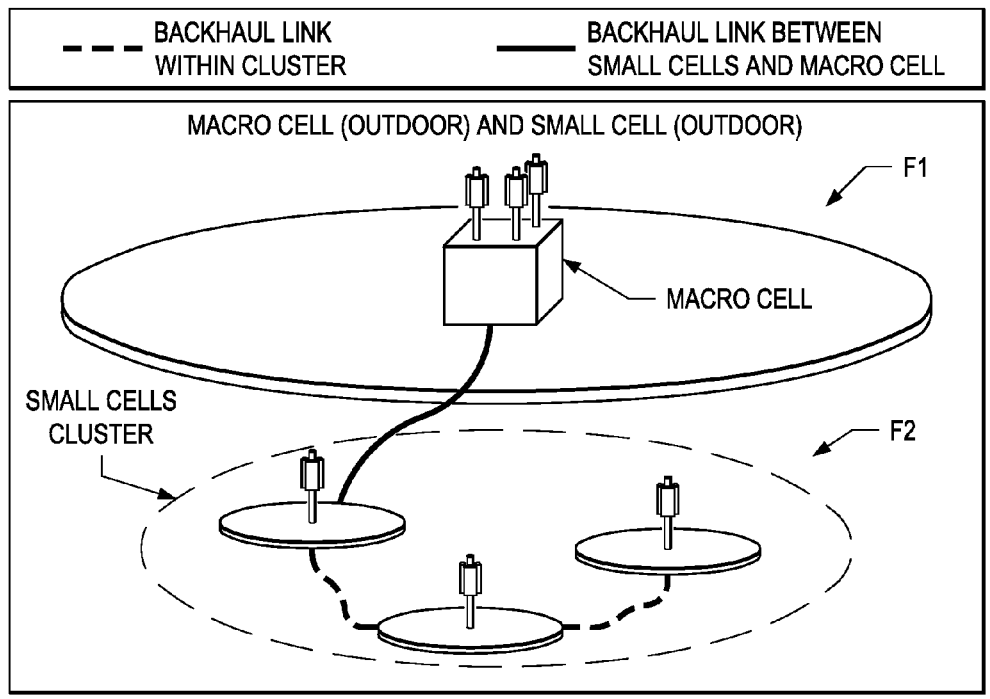
FIG. 11A illustrates a diagram of yet another embodiment wireless communications network.
Figure 11B:
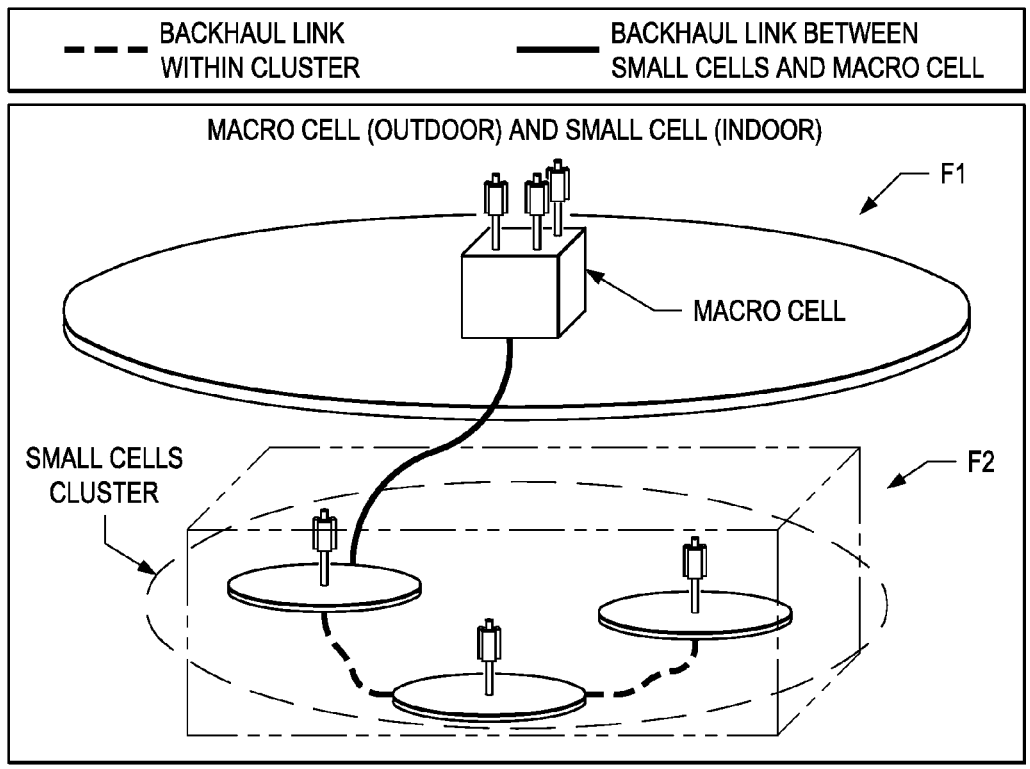
FIG. 11B illustrates a diagram of yet another embodiment wireless communications network.
Figure 12:
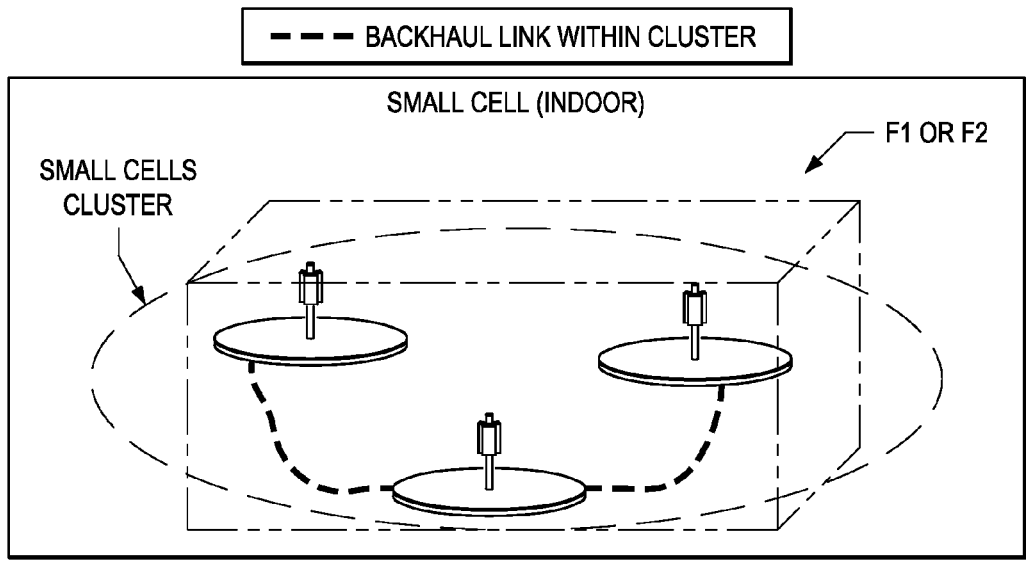
FIG. 12 illustrates a diagram of yet another embodiment wireless communications network.

Aspect of this Application can be implemented in various Het-Net configurations. FIG. 10 illustrates an embodiment wireless communications network comprising a co-channel macro-cell and small-cells. FIG. 11A illustrates an embodiment wireless communications network comprising a separate channel macro-cell and small-cells. FIG. 11B illustrates an embodiment wireless communications network comprising a separate channel macro and indoor small-cells. FIG. 12 illustrates an embodiment wireless communications network comprising small-cells without macro coverage.

User equipments may typically discover nearby small-cells by detecting downlink Primary Synchronization Signal (PSS)/Secondary Synchronization Signal (SSS) transmissions of the cell. The user equipment may then perform signal power measurements based upon the downlink CRS transmissions of the cell. If the measured signal power is above a certain threshold, the cell discovery is considered successful. For mobility and other network operation optimization purposes, user equipments may monitor several cells. To increase the likelihood of discovering weaker cells under one or two dominant strong interfering cells, interference cancellation (IC) techniques may be employed. For example, the dominant strong interfering cells are first discovered and then their PSS/SSS/CRS are reconstructed and subtracted from received signal. Weaker cell discovery is then performed upon the remaining signal. While in dense small-cell scenarios, there could be several strong interferers of similar strength. Under this interference condition, interference cancellation may be difficult due to the lack of dominant interferers. In another small-cell deployment scenario, efficient small-cell operation may utilize techniques for interference management where some small-cells are silent at certain times. With the reduced interference, it may possible to improve the network throughput performance with reduced network resources, in cases such as where the traffic load is light or medium. If the traffic load increases, then the network may activate some inactive small-cells to support the increased traffic load. For example, transmission of common signals can be avoided in certain subframes without negative impact to the RS measurements. If cells stop transmitting for a long time, discovery of those cells may be more difficult.

Figure 13:
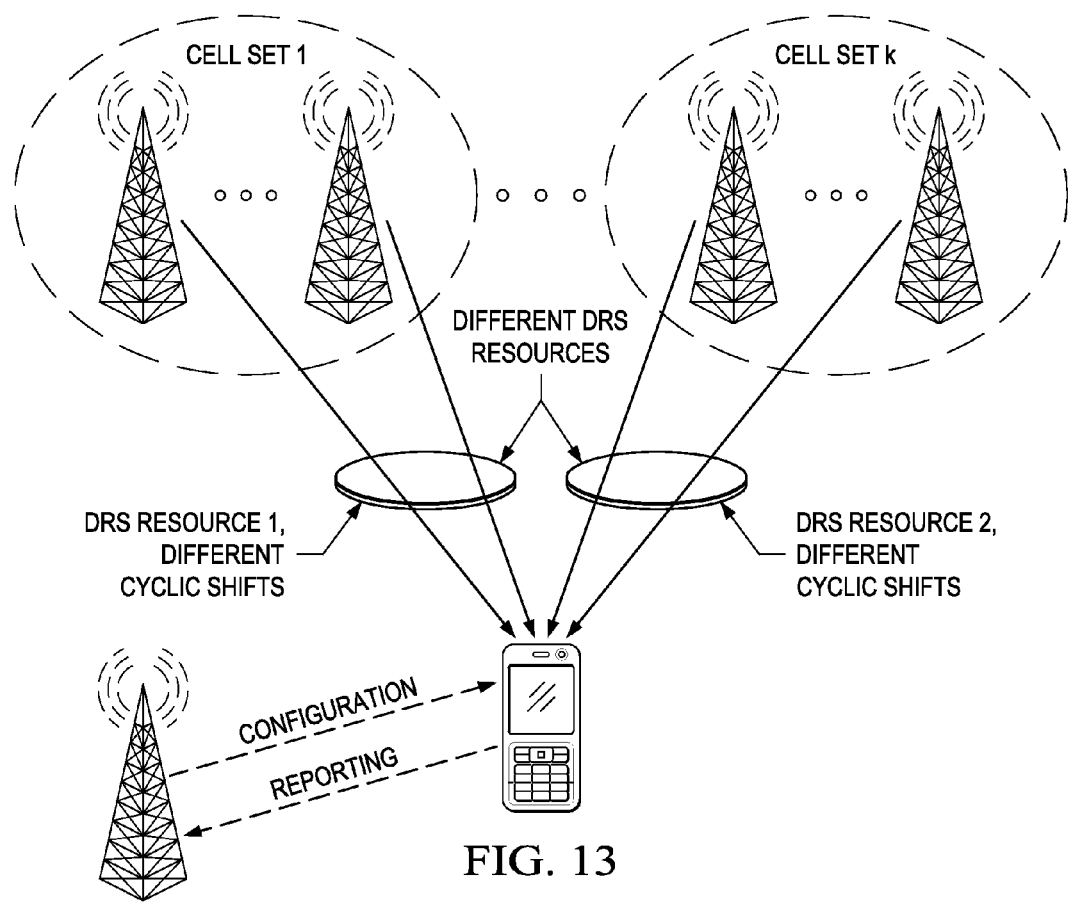
FIG. 13 illustrates a diagram of yet another embodiment wireless communications network.

Aspects of this Application provide embodiment downlink discovery reference signal (DRS) configurations for networks comprising multiple cells communicating DRS transmissions over the same frequency resources, e.g., Het-Nets, etc. FIG. 13 illustrates an embodiment wireless communications network in which different sets of cells communicate DRS transmissions. As shown, cells within the same cell set communicate DRS transmissions over the same DRS resources. To avoid interference between DRS transmissions within the same cell set, cells in the same set may apply different cyclic shifts to their DRS transmission. A DRS resource may include time, frequency, sequence, and carrier. The cells signaling the DRS configuration to the user equipment may be a subset of the cells sharing the same DRS configurations or some other cells, e.g., the macro-cell. The cells receiving user equipment DRS measurement reports may be a subset of the cells sharing the same DRS configurations or some other cells, e.g., the macro-cell.

Cells close to each other may use different RS configurations such that the RS transmissions are separated in time, frequency, space, and/or coding domains in order to avoid strong inter-cell interference among the RSs. However, different user equipments close to each other may share some RS resources in time, frequency, space, and sequence. In such a scenario, the RS may be separated based on the channel impulse response (e.g., the PDP), which is typically of finite duration. Thus, RS transmissions over the same resource (e.g., same OFDM symbol, same subcarrier, etc.) can be differentiated by applying different cyclic shift values, thereby allowing different channel PDP estimates to be obtained by the receiver. A cyclic time shift may be similar to a phase ramp in the frequency domain, and each transmitter may apply the corresponding cyclic shift by phase-ramping the subcarrier frequency.

Figure 14:
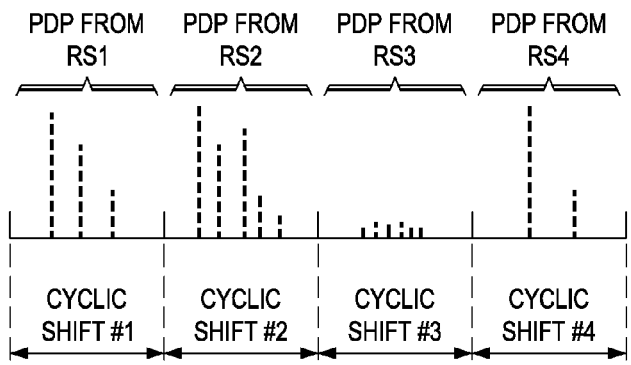
FIG. 14 illustrates a graph of an embodiment cyclic shift configuration for DRS transmissions of neighboring base stations.

FIG. 14 illustrates a graph of an embodiment cyclic shift configuration for DRS transmissions of neighboring base stations. As shown, channel PDP estimates in the time domain produce different processing results due to the different cyclic shifts applied to the DRS transmissions. In this example, four DRS transmissions are obtained by applying different cyclic shifts to the same pseudorandom sequence. The PDP estimates may not overlap in the time domain because each channel PDP estimate is assigned a different cyclic offset in the time domain. The time duration depicted in FIG. 14 corresponds to a PDP estimation time range.

Notably, it may be difficult to extend conventional uplink separation techniques to downlink RS transmissions. For example, the downlink transmissions in may not be synchronized, which may inhibit the PDP estimates from being separated with sufficient accuracy upon reception. Comparatively, uplink transmissions within a cell are typically synchronized. Additionally, a macro-cell may typically cover a relatively wide area, and the propagation delay of RS transmission from different macro-cells to a user equipment may cause PDP estimates to shift in time, thereby making it difficult to distinguish PDP estimations with sufficient accuracy. Moreover, downlink reference signals may be distributed in the time domain such that there is one RS resource element for every six resource elements. This may result in relatively small PDP estimation time ranges, which can render cyclic shifts unsuitable for distinguishing between cells.

The deployment of small-cells and small-cell clusters may improve synchronization in next generation wireless networks. Generally small-cells positioned close to each other may be synchronized with relatively high accuracy, and small-cells within a cluster may be synchronized. In addition, the propagation delay differences from different small-cells in a cluster located in relatively close proximity to a user equipment may be small due to the short range of the small-cells. Moreover, in some cases it is beneficial for the DRS to have high density in the frequency domain. Therefore, it may be feasible to allow different small-cells in a neighborhood to use the same DRS resources with only different cyclic shifts, and various benefits may follow from this design as discussed later.

In an embodiment, the signaling may be in the forms of macro-cell broadcasting, macro sending user equipment specific radio resource control (RRC) signaling, small-cell broadcasting, small-cells sending user equipment specific radio resource control (RRC) signaling or any combination of the above.

In an embodiment, a first network controller signals to a user equipment a resource for DRS transmissions from a set of network controllers (e.g., macro-cell or small-cells), the total number of possible cyclic shift or a set of cyclic shifts each of which may be used for the DRS transmission of one network controller in the set of network controllers, and a reporting configuration. The DRS resource may include a time, frequency and carrier on which the DRS is transmitted, and sequence parameters used to generate the DRS signal. The reporting configuration may include the triggering conditions for the user equipment to report the measurements on the DRS transmissions, and/or reporting resources and formats. A second network controller receives a report from the user equipment based on measurement on the DRS transmissions from the set of network controllers. In a further embodiment, a third network controller in the set of network controllers transmits a DRS on the resource with its associated cyclic shift.

In an embodiment, a user equipment receives a configuration of DRS transmissions over a set of network controllers and a reporting configuration. The user equipment then receives the DRS signal and performs the measurement. The user equipment then sends a report based on a measurement of the DRS transmissions to the network. The report may contain information about measurements associated with one or more cyclic shifts, namely, the measurements are associated with one or more small-cells applying the same sequence on the same time/frequency resources but with different cyclic shifts. Therefore, the user equipment performs demodulation and descrambling based on one pseudorandom sequence associated with different small-cells, and then separate each cell's signal in time domain, thus obtaining each cell's signal strength measurements.

In an embodiment, a DRS configuration allows for inactive and non-co-channel small-cell discovery. The DRS configuration enables a user equipment to detect and measure many dormant small-cells in a short DRS transmission burst. The DRS design enables a user equipment to detect and measure many possible small-cells on different carriers in a short DRS transmission burst.

In an embodiment, the design on the number of cyclic shift takes into consideration the transmission time difference from different network controllers and the PDP span. The transmission time difference depends on the synchronization accuracy within the network and can be bounded by positive timing uncertainty and negative timing uncertainty. The PDP span can be bound to be less than certain microsecond (us), e.g., three micro-seconds in the small-cell deployment scenario. FIG. 15 illustrates a graph of an embodiment cyclic shift range configuration. Design considerations of cyclic shift range and the corresponding number of total possible cyclic shift without PDP overlapping between two adjacent cyclic shift offsets. The following table shows several possible numbers of cyclic shifts and their cyclic offset ranges to hold the PDPs. FIG. 16 illustrates a table of embodiment cyclic shift configurations for small cell clusters.

In an embodiment implementing the DRS signal, small-cells are grouped into sets and DRS within the set share the same base sequence. The set of these small-cells may be called as a small-cell coverage set, a small-cell proximity set, a coverage set, etc. The coverage set is associated with a coverage set ID. The coverage set ID could be included in signaling sent to a user equipment or otherwise associated with the coverage set, e.g., mapping rules from PSS/SSS to coverage set ID. The coverage set ID may be used by the user equipment to generate orthogonal or pseudorandom sequences. The sequence may be used by all the small-cells within the coverage set as the base sequence for DRS transmission. Each small-cell within the coverage set applies the phase ramp corresponding to its cyclic shift upon the base sequence and maps it to subcarriers. The combined time domain signals from all of the small-cells within the coverage set form the composite DRS signal.

Figure 17:
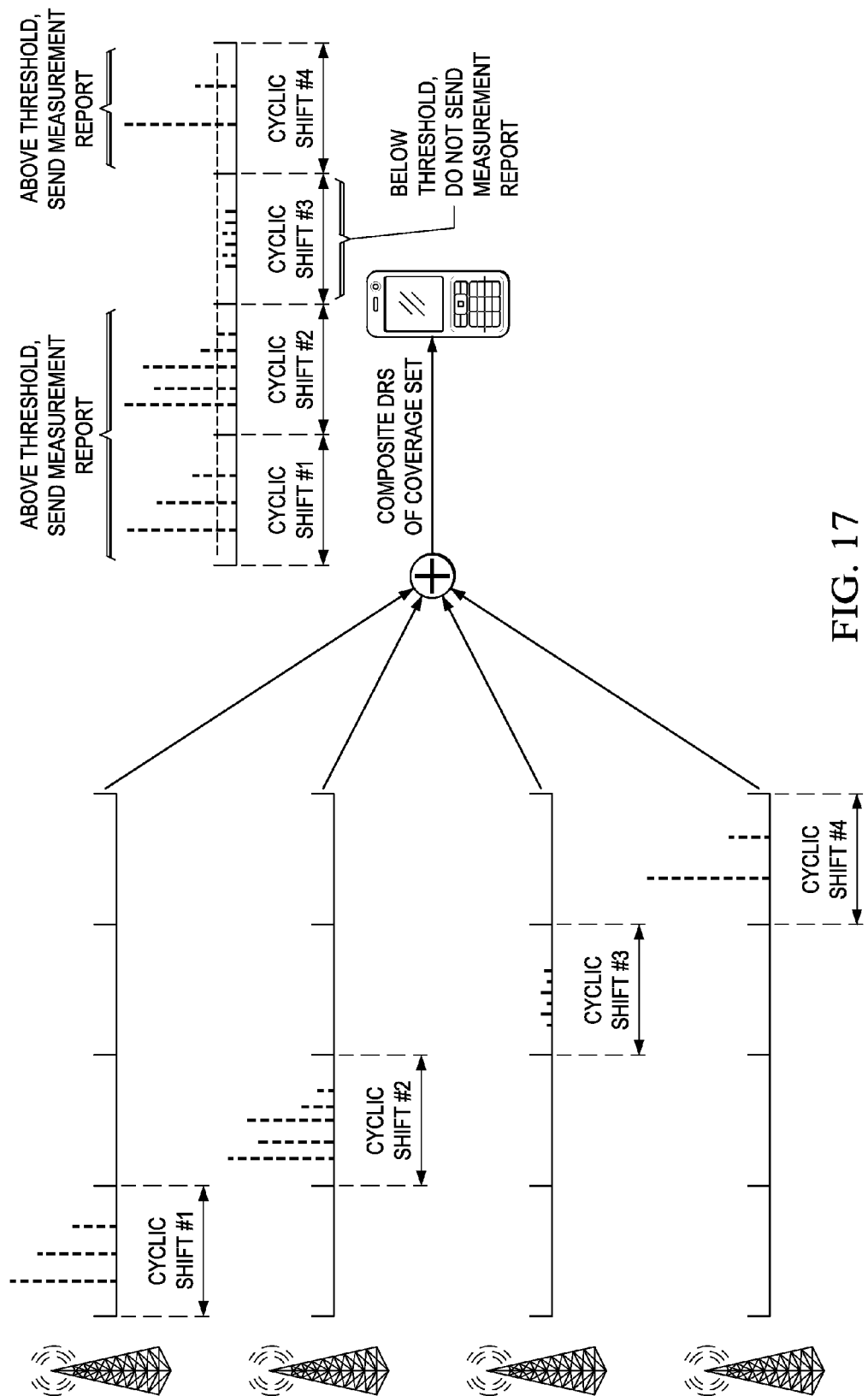
FIG. 17 illustrates a diagram of yet another embodiment wireless communications network.

FIG. 17 illustrates a diagram of yet another embodiment wireless communications network. In this example, a coverage set includes four small-cells. The user equipment receives the composite DRS signal, obtains the PDP estimates, and applies simple threshold for reporting. In an embodiment, generating the basic sequence for DRS transmission, the ZC sequences or pseudorandom sequences used for RS from current LTE specification may be reused for the base sequences of DRS.

Figures 18, 19:
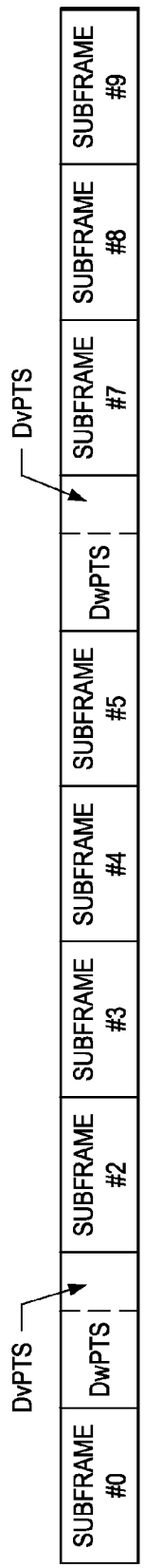
FIG. 18 illustrates a diagram of an embodiment frame structure.
FIG. 19 illustrates a table of discovery configurations.

An embodiment provides DRS transmission in a subframe with frame structure of a special discovery subframe (SDS). In the SDS, several OFDM symbols are exclusively reserved for the transmission of DRS. For the data and control channels transmitted in OFDM symbols other than these for DRS, the signals colliding with DRS are relocated or rearranged. In the special case of DRS transmission only occupies the last several OFDM symbols in the subframe, the remaining OFDM symbols which carry the control and data channels could reuse the frame structure of special subframes of TDD as described in 3GPP technical standard (TS) 36.211, which is hereby incorporated by reference herein as if reproduced in its entirety. In TDD special subframe, there are downlink pilot timing slot (DwPTS), guard time, and uplink pilot timing slot (UpPTS). The DwPTS may be kept in SDS so that normal downlink transmissions by cells (or by active cells) may be performed, but the guard time and UpPTS may be replaced by a proposed downlink discovery pilot timing slot (DvPTS). FIG. 18 illustrates an embodiment frame structure for SDS. The frame structure may include 5 ms periodicity and the following table shows the detailed OFDM division between downlink pilot timing slot (DwPTS) and downlink discovery pilot timing slot (DvPTS). FIG. 19 illustrates a table of discovery configurations.

All of the last several OFDM symbols or a subset of these could be configured to carry the DRS transmission. Several SDS can be configured to form one DRS transmission occasion. These configurations can be signaled to the user equipment or otherwise predefined.

An embodiment provides DRS transmission in configured MBSFN subframe. Excluding the first two OFDM symbols reserved for control channels, all of the remaining OFDM symbols or a subset of these could be configured to carry the DRS transmission and the configuration is part of the signaling to user equipment or predefined.

An embodiment provides DRS transmission in the configured OFDM symbol. All of the subcarriers in the OFDM symbol or a subset of it can be used for the transmission of DRS, e.g., every other subcarriers in the OFDM symbols are configured for DRS transmission. The configuration is part of the signaling to user equipment or predefined.

An embodiment provides DRS transmission in a subframe with cyclic prefix length different from other subframes without DRS transmission. Since there is a wide range of synchronization accuracy levels between the small-cells operated by different wireless service providers, it could be beneficial for the subframe containing the DRS transmission to employ a different cyclic prefix length, e.g., extended cyclic prefix length is used in subframe with DRS transmission. The longer cyclic prefix length also provides additional benefit of easing the requirement on user equipment timing tracking accuracy and complexity.

An embodiment provides the triggering condition of sending the DRS. DRS can be configured to transmit aperiodically or periodically. In periodic DRS transmission, a periodicity is configured. In the case of aperiodic DRS transmission, DRS may be transmitted only once or multiple times at the configured transmission occasion. The configurations are part of the signaling to the user equipment or may be partially or completely in a separate signaling.

An embodiment provides the triggering condition of aperiodic DRS transmission. Single short DRS transmission may be the result of monitoring the user equipment uplink signal transmission or network reconfiguration operations, e.g., turn on/off the small-cells.

An embodiment provides user equipment processing on the received DRS. The user equipment receives the configured DRS transmission and performs the radio resource measurements, e.g., measure the received DRS power within the cyclic shift range independently. In case there are more than one OFDM symbols carrying the DRS, averaging of DRS corresponding to each cyclic shift on these OFDM symbols could be performed to further suppress the interference plus noise. Different measurement results are obtained for each possible cyclic shift.

An embodiment provides user equipment generating the measurement reports on the received DRS. Each measurement result obtained within the cyclic shift range is checked independently against the configured criteria, e.g., the received power should be above certain threshold. Among these DRS measurement results which pass the criteria, user equipment may report only the highest one along with its cyclic shift information. The user equipment may report all the measurement results which pass the criteria along with their corresponding cyclic shift information. The measurement type and criteria are part of the signaling to user equipment or predefined. In general, the user equipment may report the top N measurements associated with one sequence (i.e. one coverage set) or multiple sequences (coverage sets), or report all measurements above a threshold associated with one sequence (i.e. one coverage set) or above one or more thresholds associated with multiple sequences (coverage sets), or a combination of these. Various embodiments may be provided for various purposes.

In embodiments, DRS may be transmitted with very small spacing between subcarriers and OFDM symbols to allow many inactive small-cells to be detected in a short DRS transmission burst. The DRS may be transmitted on contiguous subcarriers. It may be transmitted in a narrow band, similar to CRS used for user equipment to perform RRM measurements, but in some cases it may be desired to transmit at wideband. In either case the bandwidth of the DRS may be configured in the DRS configuration signaling. In some cases, to reduce the overhead of DRS, wider and even non-uniform spacings between DRS REs may be used. The non-uniform spacings between DRS REs may be useful for expanding the PDP estimation time range to the full DRS symbol duration, but exactly how the non-uniform spacings may be signaled may affect the obtained PDP estimation accuracy, and certain patterns may need to be adopted for the user equipment to find all the DRS REs. Orthogonality by cyclic shift helps to mitigate the strong interference seen in the small-cell environment. A composite DRS with each eNB transmitting at a different cyclic shift helps to reduce user equipment operation complexity. PSS/SSS may or may not be transmitted by other small-cells within the coverage set, once user equipment obtains the DRS configuration, user equipment may not need to detect these PSS/SSS for the other small-cells sharing the same base DRS sequence within the coverage set. Single descrambling, inverse Fast Fourier Transform (IFFT) and channel estimation filtering operation for small-cells share the same base DRS sequence help to reduce the user equipment operation complexity.

Figure 20A:
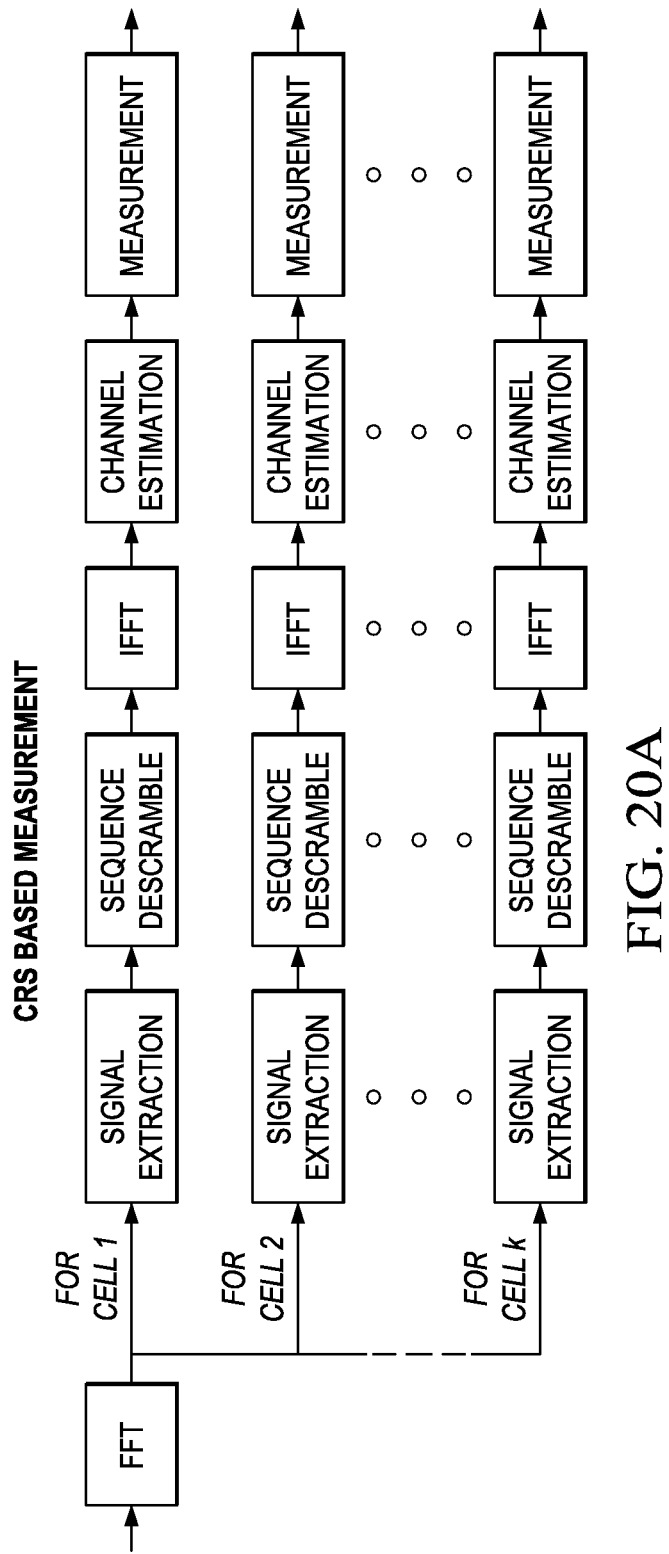
FIGS. 20A-20B illustrate diagrams of process flows for performing reference signal measurements.
Figure 20B:
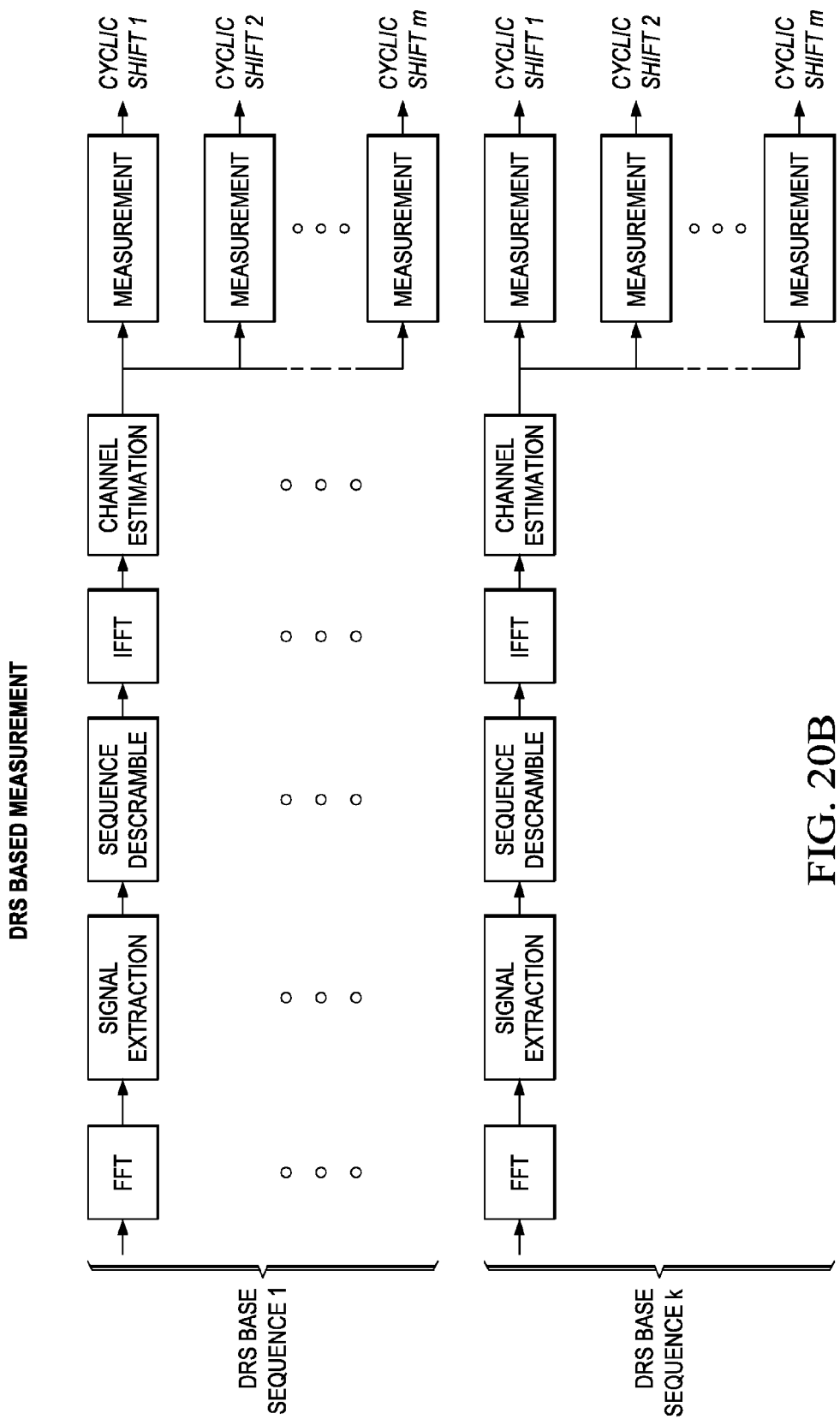

For comparison, FIG. 20A illustrates a process flow for performing a CRS measurement. If a user equipment is required to perform detection and measurement for 12 small-cells and up to 5 active carriers, the user equipment needs to support 60 detection and measurement processes. FIG. 20B illustrates a process flow for performing a DRS measurement. The operation complexity reduction is roughly proportional to the number of cyclic shift configured for the small-cell sharing the same base sequence.

A composite signal with each eNB transmitting with a different cyclic shift helps to perform DRS interference cancellation effectively. A user equipment may see several strong small-cell signals in a dense deployment. Effective CRS/PSS/SSS interference cancellation generally is hard to achieve in such scenarios. A composite DRS signal from neighboring small-cells sharing the same base sequence can be estimated and cancelled altogether.

Figure 21A:
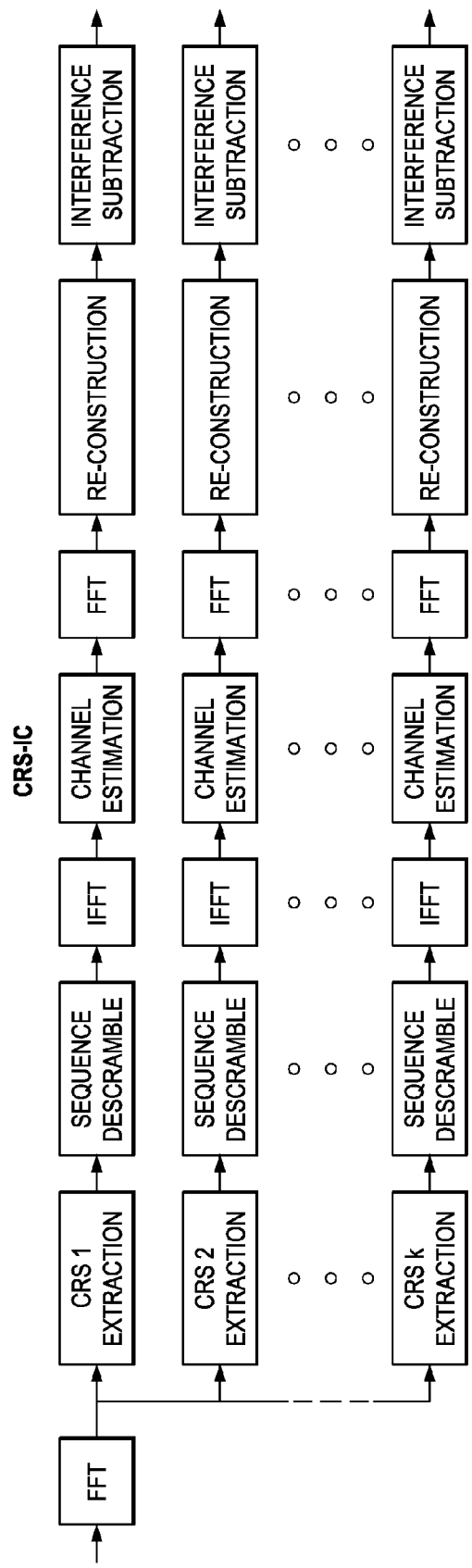
FIGS. 21A-21B illustrate diagrams of additional process flows for performing reference signal measurements.
Figure 21B:
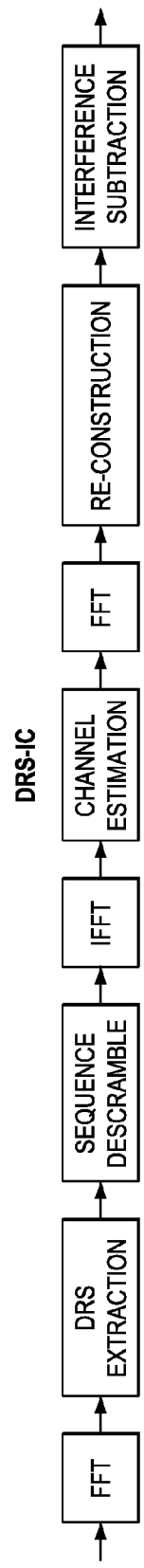

FIG. 21A illustrates a process flow for performing a CRS-IC measurement. FIG. 21B illustrates a process flow for performing a DRS-IC measurement. The operation complexity reduction of DRS interference cancellation is proportional to the number of cyclic shifts configured for the small-cell sharing the same base sequence.

An embodiment provides an index method for small-cells within a coverage set. According to the order of the cyclic shift assigned to a small-cell in a coverage set, the cell may be indexed implicitly or explicitly. In other words, the cyclic shifts may be associated with indexes such as 0, 1, . . . , and so on. Then the cell transmitting DRS with cyclic shift index 0 may be indexed within the coverage set as 0, so on and so forth. Such cell index may not be related to the cell ID of the small-cell to allow the network to have high flexibility of assigning cell IDs and coverage set ID/sequence, but in some cases there may be a relation between the cell index within the coverage set and the cell ID. The embodiments may include: the cell ID is a function of the coverage set ID and the cell index, and the function may be an offset function; the cell ID may be the coverage set ID appended by the cell index, in which case the cell ID may not be one supported by the legacy carrier.

The association between the DRS and the small-cells transmitting the DRS, and the association between the DRS cyclic shift and the small-cells transmitting the DRS with the cyclic shift may be non-transparent or transparent to the user equipment. In an embodiment, a DRS with a cyclic shift is tied to a small-cell in the coverage set, and the DRS signaling may not configure the cyclic shift set or the number of cyclic shifts explicitly; rather it signals the coverage set configuration or the number of cells (or DRS-transmitted cells, or total cells) in the set. In an embodiment, a DRS with a cyclic shift may be associated with a cell, or a cell's one or more antenna ports, in a quasi-co-located fashion, thus generalizing the concept of quasi-co-location used in CoMP. Two antenna ports are said to be quasi co-located if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, and average delay. A UE shall not assume that two antenna ports are quasi co-located unless specified otherwise. Here, if the quasi-co-location with respect to delay spread, Doppler spread, Doppler shift, and average delay between CRS and DRS is signaled, then the UE can assume the CRS and DRS are associated with the same timing and frequency. Such association relationship may be signaled to a user equipment in the DRS configuration signaling, DRS triggering signaling, or a separate signaling. One advantage of signaling such a relationship may be that the user equipment may connect the DRS and/or DRS based measurements with other signals/channels/measurements. For example, a small-cell may be turned off for interference/traffic adaptation purposes, and it may transmit DRS for discovery purposes; with the connection between the cell and the DRS, the DRS measurements may be used by the user equipment for its RRM measurements, such as to shorten the needed RRM measurement duration based on CRS. However, the user equipment does not need to know if the DRS is transmitted from a turned-off cell or not; the user equipment may just need to know that the DRS is transmitted from some antennas that is quasi-co-located with a cell, thus giving the network sufficient capability to fully utilize the DRS based measurement but avoiding the need to inform the user equipment the cell's status. Therefore, the cell on/off may be transparent to user equipments.

In an embodiment, the association of the DRS and/or the cyclic shift with cells may not be specified for user equipments, nor may such an association be assumed implicitly or explicitly during the demodulation/measurement/reporting processes. The user equipment may report measurements associated with one or more DRSs with cyclic shifts, but the network may make the necessary connections between the measurements and cells.

Small-cell on/off adaptation refers to the adaptive turning on and turning off of a small-cell. When the small-cell is turned on, it acts as a legacy carrier and may transmit the signals existing in a legacy carrier and signals necessary for data transmission, such as reference signals used for measurements and demodulation. When the small-cell is turned off, it does not transmit any legacy carrier signals or signals necessary for data transmission. The main purpose of small-cell on/off adaptation is for interference avoidance and coordination. A network may turn off certain small-cells to reduce inter-cell interference, especially the interference caused by common channel transmissions such as CRS. Similar concepts may be applied to carrier on/off adaptation and carrier selection. The discovery signals may be transmitted from the antenna(s) of a small-cell that is turned off. However, from a user equipment's measurement perspective, all that the user equipment experiences is certain discovery signals that may be associated with a small-cell when it is turned on. In this sense, the small-cell when turned off does not transmit anything and logically does not exist from a user equipment point of view even if discovery signal is transmitted from the same set of antennas.

Therefore, an embodiment method for signaling a DRS includes a first network controller signaling to a user equipment a resource for DRS transmissions from a set of network controllers and/or antenna ports, signaling a set of cyclic shifts or the number of total possible cyclic shifts, each cyclic shift corresponding to a respective DRS transmission by a network controller and/or antenna ports in the set of network controllers and/or antenna ports, in which such a corresponding relationship may be signaled as a quasi-co-location of DRS antenna ports with cells, and signaling reporting configuration. An embodiment method for utilizing a DRS includes a user equipment receiving a configuration of DRS transmissions of a set of network controllers and/or antenna ports and a reporting configuration, receiving the DRS signal, performing a measurement of the DRS transmissions, and sending a report in accordance with the measurement of the DRS transmissions, in which a measurement is associated with a cyclic shift of a DRS.

Another embodiment method for signaling a DRS includes a first network controller signaling to a user equipment a resource for DRS transmissions, signaling a set of cyclic shifts or the number of total possible cyclic shifts, each cyclic shift corresponding to a respective DRS measurement that may be reported, and signaling reporting configuration. An embodiment method for utilizing a DRS includes a user equipment receiving a configuration of DRS transmissions and a reporting configuration, receiving the DRS signal, performing a measurement of the DRS transmissions, and sending a report in accordance with the measurement of the DRS transmissions, in which a measurement is associated with a cyclic shift of a DRS.

In a multiple carrier case, the DRS may be sent from different carriers. However, the user equipment has to monitor multiple carriers for DRS and the cell has to transmit on multiple carriers. If the cell has turned off some or all of its carriers, it may not be desired to turn on all the carriers for DRS transmissions. One embodiment has the cell transmit on fewer carriers, or just one common carrier, and uses sequence/time/frequency to distinguish different carriers' DRSs, in intra-band or inter-band carrier cases. In some cases, there may not even be a need to distinguish since the network may be able to compensate the path-loss differences due to carrier frequency differences. The above descriptions can be applied to LTE systems, as well as other systems such as HSPA systems, WiFi systems, etc.

Aspects of this Application provide a method for signaling a discovery reference signal (DRS), the method comprising: sending, by a network controller, a first message to a user equipment (UE), the first message specifying a common resource for DRS transmissions of a plurality of base stations; and sending, by the first network controller, a second message to the UE, the second message specifying cyclic shifts for the DRS transmissions, wherein each of the DRS transmissions are communicated over the common resource using a different one of the cyclic shifts.

In some embodiments, the first message specifies a common time resource carrying the first DRS transmission and the second DRS transmission. In some embodiments, the first message specifies a common frequency resource carrying the first DRS transmission and the second DRS transmission. In some embodiments, the first message specifies a common frequency sub-band carrying the first DRS transmission and the second DRS transmission. In some embodiments, the first message specifies a set of subcarriers carrying the first DRS transmission and the second DRS transmission. In some embodiments, the first message specifies a time-frequency resource used to carry the first DRS transmission and the second DRS transmission. In some embodiments, the first message specifies a set of orthogonal frequency division multiplexed (OFDM) symbols of a Multicast-broadcast single-frequency network (MBSFN) subframe used to carry the first DRS transmission and the second DRS transmission.

Aspects of this Application provide a method for base station discovery comprising: receiving, by a user equipment, a first discovery resource signal (DRS) transmission from a first base station over a common network resource, wherein the first DRS transmission is communicated in accordance with a first cyclic shift; and receiving, by the user equipment, a second DRS transmission from a second base station over the common network resource, wherein the second DRS transmission is communicated in accordance with a second cyclic shift that is different than the first cyclic shift. In some embodiments, the method further comprises: performing measurements of the first DRS transmission and the second DRS transmission; and reporting the measurements to a network controller.

Figure 22:
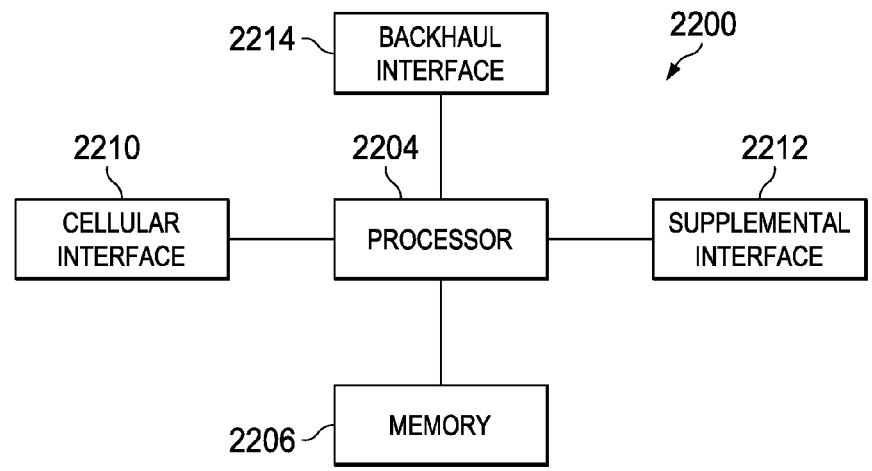
FIG. 22 illustrates a diagram of an embodiment communications device.

FIG. 22 illustrates a block diagram of an embodiment of a communications device 2200, which may be equivalent to one or more devices (e.g., UEs, NBs, etc.) discussed above. The communications device 2200 may include a processor 2204, a memory 2206, a cellular interface 2210, a supplemental interface 2212, and a backhaul interface 2214, which may (or may not) be arranged as shown in FIG. 22. The processor 2204 may be any component capable of performing computations and/or other processing related tasks, and the memory 2206 may be any component capable of storing programming and/or instructions for the processor 2204. The cellular interface 2210 may be any component or collection of components that allows the communications device 2200 to communicate using a cellular signal, and may be used to receive and/or transmit information over a cellular connection of a cellular network. The supplemental interface 2212 may be any component or collection of components that allows the communications device 2200 to communicate data or control information via a supplemental protocol. For instance, the supplemental interface 2212 may be a non-cellular wireless interface for communicating in accordance with a Wireless-Fidelity (Wi-Fi) or Bluetooth protocol. Alternatively, the supplemental interface 2212 may be a wireline interface. The backhaul interface 2214 may be optionally included in the communications device 2200, and may comprise any component or collection of components that allows the communications device 2200 to communicate with another device via a backhaul network.

Figure 23:
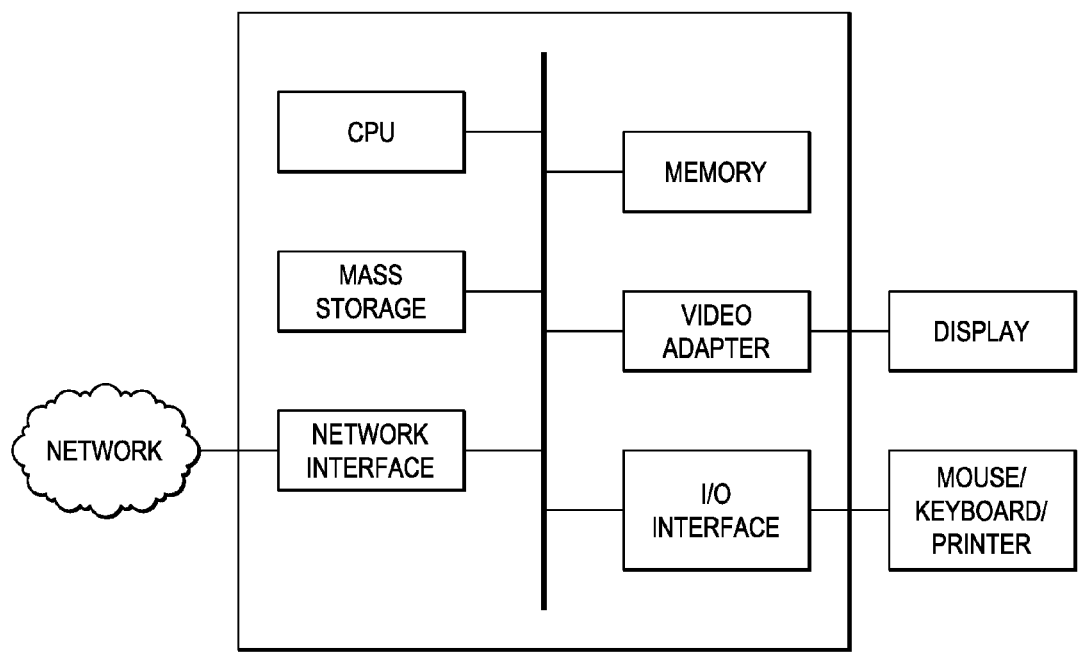
FIG. 23 illustrates a diagram of an embodiment computing platform.

FIG. 23 is a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Although the description has been described in detail, it should be understood that various changes, substitutions and alterations can be made without departing from the spirit and scope of this description as defined by the appended claims. Moreover, the scope of the description is not intended to be limited to the particular embodiments described herein, as one of ordinary skill in the art will readily appreciate from this description that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method for signaling comprising:
   receiving, by a user equipment (UE), a discovery reference signal (DRS) transmission over a first antenna port and a cell-specific reference signal (CRS) transmission over a second antenna port, the first antenna port being different from the second antenna port, the DRS transmission being a different type of signal than the CRS transmission;
   processing, by the UE, the DRS transmission to obtain a DRS processing result;
   processing, by the UE, the CRS transmission to obtain a CRS processing result, the DRS transmission being received prior to the CRS transmission; and
   using, by the UE, the DRS processing result in conjunction with the CRS processing result to establish channel synchronization with the second antenna port when the first antenna port and the second antenna port are quasi-co-located (QCL).

2. The method of claim 1, further comprising:
   using, by the UE, the CRS processing result to establish channel synchronization with the second antenna port without using the DRS processing result to establish the channel synchronization when the first antenna port and the second antenna port are not QCL.

3. The method of claim 1, further comprising:
   receiving, by the UE, a message from a network device, the message indicating that the first antenna port and the second antenna port have a QCL relationship.

4. The method of claim 1, further comprising:
   determining, by the UE, that the first antenna port and the second antenna port are QCL according to a priori information of the UE.

5. The method of claim 1, further comprising:
   receiving, by the UE, a handover message indicating that the UE is being handed over from a source cell to a target cell, and wherein the DRS transmission and the CRS transmission are communicated by the target cell.

6. The method of claim 5, wherein the DRS transmission is communicated over a first set of resources mapped to the first antenna port, and wherein the CRS transmission is communicated over a second set of resources mapped to the second antenna port, the first set of resources being different than the second set of resources.

7. The method of claim 5, further comprising:
   communicating the DRS processing result to a network device prior to receiving the handover message, the DRS processing result being obtained during a first period, wherein the target cell operates in a sleep mode during the first period, and wherein the target cell is configured to communicate the DRS transmission without communicating the CRS when operating in a sleep mode.

8. The method of claim 7, wherein communicating the DRS processing result to the network device prompts the target cell to transition from the sleep mode to an active mode, and wherein the target cell is configured to transmit at least the CRS transmission when operating in the active mode.

9. The method of claim 5, wherein the target cell and the source cell are low power nodes.

10. The method of claim 5, wherein the target cell is a low power node and the source cell is a macro base station.

11. The method of claim 5, wherein the source cell and the target cell are associated with a common base station configured for carrier aggregation.

12. A user equipment comprising:
    a processor, and
    a non-transitory computer readable storage medium coupled to the processor and storing programming for execution by the processor, the programming including instructions to:
    receive a discovery reference signal (DRS) transmission over a first antenna port and a cell-specific reference signal (CRS) transmission over a second antenna port, the
    first antenna port being different from the second antenna port, the DRS transmission being a different type of signal than the CRS transmission;
    process the DRS transmission to obtain a DRS processing result;
    process the CRS transmission to obtain a CRS processing result, the DRS transmission being received prior to the CRS transmission; and
    use the DRS processing result in conjunction with the CRS processing result to establish channel synchronization with the second antenna port when the first antenna port and the second antenna port are quasi-co-located (QCL).

13. The user equipment of claim 12, wherein the programming further includes instructions to:
    communicate the DRS processing result to a network device prior to processing the CRS transmission, the DRS processing result being obtained during a period in which a target cell operates in a sleep mode, wherein the target cell is configured to communicate the DRS transmission without communicating the CRS when operating in a sleep mode; and
    receive a handover message after communicating the DRS processing result to the network device, the handover message indicating that the user equipment is being handed over from a source cell to the target cell, and wherein the DRS transmission and the CRS transmission are communicated by the target cell, wherein communicating the DRS processing result to the network device prompts the target cell to transition from the sleep mode to an active mode, and wherein the target cell is configured to transmit at least the CRS transmission when operating in the active mode.

14. A method for discovery reference signaling, the method comprising:

sending, by a network device, a first message to a user equipment, the first message indicating that a discovery resource signal (DRS) transmission is being communicated over a first antenna port, wherein the DRS transmission is communicated-by a target cell; and sending, by the network device, at least one additional message to the user equipment, the at least one additional message indicating both that a cell-specific reference signal (CRS) transmission is being communicated over a second antenna port, and that the second antenna port is quasi-co-located with the first antenna port, the second antenna port being different than the first antenna port, wherein the CRS transmission is communicated after the DRS transmission by the target cell, and wherein the at least one additional message indicating that that the second antenna port is quasi-co-located with the first antenna port prompts the user equipment to use a DRS processing result obtained from the DRS transmission to establish channel synchronization with the second antenna port.

15. The method of claim 14, wherein the DRS transmission is communicated over a first set of resources mapped to the first antenna port, and wherein the CRS transmission is communicated over a second set of resources mapped to the second antenna port, the first set of resources being different than the second set of resources.

16. The method of claim 14, wherein the DRS transmission and the CRS transmission are communicated by the target cell, the DRS transmission being configured with a longer duty cycle than the CRS transmission.

17. The method of claim 14, wherein the at least one additional message includes a handover message indicating that the user equipment is being handed over from a source cell to the target cell.

18. The method of claim 17, further comprising:
receiving, by the network device, a measurement report from the user equipment prior to sending the handover message to the user equipment, the measurement report comprising DRS processing results obtained from the DRS transmission during a first period, wherein the target cell operates in a sleep mode during the first period, and wherein the target cell is configured to communicate the DRS transmission without communicating the CRS transmission when operating in a sleep mode.

19. The method of claim 18, further comprising:
prompting the target cell to transition from the sleep mode to an active mode when the DRS processing results satisfy a criteria, wherein the target cell is configured to transmit at least the CRS transmission when operating in the active mode.

20. The method of claim 17, wherein the source cell is a macrocell, and wherein the target cell is a low power node.

21. The method of claim 17, wherein the source cell and the target cell are neighboring low power nodes.

22. The method of claim 17, wherein the source cell and the target cell are associated with a common base station configured for carrier aggregation.

23. A network device comprising:
a processor; and
a non-transitory computer readable storage medium storing programming for execution by the processor, the programming including instructions to:
send a first message to a user equipment, the first message indicating that a discovery resource signal (DRS) transmission is being communicated over a first antenna port, wherein the DRS transmission is communicated by a target cell; and
send at least one additional message to the user equipment, the at least one additional message indicating both that a cell-specific reference signal (CRS) transmission is being communicated over a second antenna port, and that the second antenna port is quasi-co-located with the first antenna port, the second antenna port being different than the first antenna port, wherein the CRS transmission is communicated after the DRS transmission by the target cell, and wherein the at least one additional message indicating that the second antenna port is quasi-co-located with the first antenna port prompts the user equipment to use a DRS processing result obtained from the DRS transmission to establish channel synchronization with the second antenna port.

24. The network device of claim 23, wherein the at least one additional message includes a handover message indicating that the user equipment is being handed over from a source cell to the target cell, and wherein the programming further includes instructions to: receive a measurement report from the user equipment prior to sending the handover message to the user equipment, the measurement report comprising a DRS processing result obtained from the DRS transmission during a period in which the target cell operates in a sleep mode, wherein the target cell is configured to communicate the DRS transmission without communicating the CRS transmission when operating in a sleep mode; and
prompting the target cell to transition from the sleep mode to an active mode when the DRS processing result satisfies a criteria, wherein the target cell is configured to transmit at least the CRS transmission when operating in the active mode.

25. A method for communicating in a wireless network, the method comprising:
receiving, by a user equipment (UE), a first reference signal (RS) associated with a cell, wherein the first RS is different than a cell-specific reference signal (CRS) associated with the cell, and wherein the first RS is received at a different time than the CRS; and
performing, by the UE, a radio resource management (RRM) measurement based at least on the first RS without assuming the CRS is carried in one or more downlink subframes following a subframe carrying the first RS.

26. The method of claim 25, wherein performing the RRM measurement further comprises:
performing the RRM measurement based on the first RS under the assumption that a primary synchronization signal (PSS), a secondary synchronization signal (SSS), a physical downlink shared channel (PDSCH), a physical downlink control channel (PDCCH), an enhanced physical downlink control channel (EPDCCH), a demodulation reference signal (DMRS), and a channel state information reference signal (CSI-RS) associated with the cell are not transmitted in the one or more downlink subframes following the subframe carrying the first RS.

27. The method of claim 25, wherein the UE assumes that the PSS, the SSS, the CRS, the PDSCH, the PDCCH, the EPDCCH, the DMRS, and the CSI-RS associated with the cell are not transmitted in the one or more downlink subframes following the subframe carrying the first RS when a downlink transmission of the cell is turned off.

28. The method of claim 25, wherein the UE does not assume any other signals or physical channels are present in the one or more downlink subframes following the subframe carrying the first RS for the RRM measurement based on the first RS.

29. The method of claim 25, wherein a first antenna port associated with the first RS is quasi-co-located (QCL) with a second antenna port associated with the CRS.

30. The method of claim 29, wherein the first antenna port is QCL with the second antenna port with respect to at least the average delay and Doppler shift.

31. A method for communicating in a wireless network, the method comprising:
- transmitting, by a base station, a configuration signaling to a user equipment (UE), the configuration signaling configuring the UE to perform a radio resource management (RRM) measurement based at least on a first reference signal (RS) without assuming that a cell-specific reference signal (CRS) associated with the cell is carried in one or more downlink subframes following a subframe carrying the first RS, the first RS being different than the CRS, and the first RS being communicated at a different time than the CRS;
- transmitting, by the base station, the first RS to the UE; and
- suspending, by the base station, transmission of the CRS in one or more downlink subframes following a subframe carrying the first RS.

* * * * *